US012316039B2

(12) United States Patent
Hashimoto et al.

(10) Patent No.: US 12,316,039 B2
(45) Date of Patent: May 27, 2025

(54) CONNECTOR AND CONNECTOR SET

(71) Applicants: ACES Japan Co., Ltd., Tokyo (JP); ACES Electronics Co.,Ltd., Taiwan (TW)

(72) Inventors: Hiroaki Hashimoto, Tokyo (JP); Nobukazu Kato, Tokyo (JP)

(73) Assignees: ACES Japan Co., Ltd., Tokyo (JP); ACES Electronics Co., Ltd., Zhongli (CN)

( * ) Notice: Subject to any disclaimer, the term of this patent is extended or adjusted under 35 U.S.C. 154(b) by 351 days.

(21) Appl. No.: 17/910,028

(22) PCT Filed: Mar. 9, 2021

(86) PCT No.: PCT/JP2021/009221

§ 371 (c)(1),
(2) Date: Sep. 8, 2022

(87) PCT Pub. No.: WO2021/182450

PCT Pub. Date: Sep. 16, 2021

(65) Prior Publication Data

US 2023/0112519 A1 Apr. 13, 2023

(30) Foreign Application Priority Data

Mar. 10, 2020 (JP) ................................. 2020-040806

(51) Int. Cl.
*H01R 13/11* (2006.01)
*F21V 23/06* (2006.01)
(Continued)

(52) U.S. Cl.
CPC .............. *H01R 13/11* (2013.01); *F21V 23/06* (2013.01); *H01R 13/2407* (2013.01); *H01R 12/716* (2013.01)

(58) Field of Classification Search
CPC .... H01R 9/096; H01R 23/725; H01R 23/688; H01R 23/6873; H01R 13/11; H01R 13/2407; F21V 23/06
(Continued)

(56) References Cited

U.S. PATENT DOCUMENTS 4,762,500 A 8/1988 Dola et al.
5,073,119 A 12/1991 Soes
(Continued)

FOREIGN PATENT DOCUMENTS

EP 1628369 A1 * 2/2006 ......... H01R 13/6583
JP 01-501982 A 7/1989
(Continued)

OTHER PUBLICATIONS

International Search Report of PCT/JP2021/009221 dated May 25, 2021.

*Primary Examiner* — Gary F Paumen
(74) *Attorney, Agent, or Firm* — Shih IP Law Group, PLLC

(57) ABSTRACT

The present invention makes it possible to provide a connector comprising a contact that forms an electric connection with a counterpart contact, having a first contact piece and a second contact piece branched by a bifurcated branching part, as well as a first contact point element provided to the first contact piece and a second contact point element provided to the second contact piece in contact with the surface of the counterpart contact when the counterpart contact is inserted between the first contact piece and the second contact piece. At least one of the contact pieces has a first elastic part that has elasticity and is capable of being displaced in a direction orthogonal to the plate thickness. Providing a part curved in the plate thickness direction between the branching part of the contact pieces and the contact point elements allows the connector to adapt to the
(Continued)

space allowed to the connector while maintaining a sufficient elastic force. The contact may have first and second contact pieces that differ in length and shape, but maintaining the contact points at the same position makes it possible to prevent a rotational moment received by the counterpart contact at the time of fitting.

17 Claims, 23 Drawing Sheets

(51) Int. Cl.
*H01R 12/71* (2011.01)
*H01R 13/24* (2006.01)

(58) Field of Classification Search
USPC ........................................... 439/816, 74, 108
See application file for complete search history.

(56) References Cited

U.S. PATENT DOCUMENTS

| | | | | |
|---|---|---|---|---|
| 5,324,215 | A | 6/1994 | Walkup | |
| 5,697,799 | A | 12/1997 | Consoli | |
| 7,585,185 | B2 * | 9/2009 | Obikane | H01R 13/6581 439/74 |
| 8,292,630 | B1 * | 10/2012 | Bobuk | H01R 12/73 439/74 |
| 8,986,027 | B2 * | 3/2015 | Nishimura | H01R 43/24 439/74 |
| 2005/0181683 | A1 | 8/2005 | Miyamoto | |
| 2013/0244482 | A1 | 9/2013 | Kondo | |
| 2014/0370749 | A1 * | 12/2014 | Kato | H01R 12/73 439/607.31 |
| 2015/0207248 | A1 * | 7/2015 | Takenaga | H01R 12/716 439/74 |

FOREIGN PATENT DOCUMENTS

| | | | |
|---|---|---|---|
| JP | H02-295077 | A | 12/1990 |
| JP | 03-077284 | A | 4/1991 |
| JP | 08-241762 | A | 9/1996 |
| JP | 2000-516028 | A | 11/2000 |
| JP | 2005-317262 | A | 11/2005 |
| JP | 2010-177094 | A | 8/2010 |
| JP | 2013-225475 | A | 10/2013 |
| WO | 2010088580 | A1 | 8/2010 |

* cited by examiner

CONNECTOR AND CONNECTOR SET

TECHNICAL FIELD

The present invention relates to a contact to be connected to a counterpart contact and also relates to a connector equipped with the contact.

BACKGROUND ART

In recent years, size reduction of devices on which connectors are mounted has increased the demand of size reduction of the connectors. A typical connector has spring arms having elasticity, and the spring arms are brought into contact with plate-like counterpart contacts having no spring arm. Accordingly, it is necessary to reduce the size of each spring arm to reduce the size of the connector. On the other hand, in order to maintain stable connection, it is effective to adopt a so-called "double-sided contact structure", in which opposite surfaces of the plate-like counterpart contact are nipped by spring arms.

From manufacturing point of view, there are two different types of spring arm, in other words, a metal-bending spring and a metal-stamping spring. The metal-bending spring is a spring of which spring arms are displaced in the plate thickness direction, whereas the metal-stamping spring is a spring of which spring arms are displaced in a direction orthogonal to the plate thickness direction (i.e., in the horizontal direction). The metal-stamping springs are easier to manufacture and widely used, for example, for FPC connectors. Examples of the metal-stamping spring include a tuning fork type spring in which both spring arms have the same structure and a type of spring having a spring arm and a non-spring arm that oppose each other.

An example of a connector subjected to size reduction is a board-to-board connector that is used in a backlight module for a television set. The board-to-board connectors are used to mutually connect relay circuit boards that relay electrical connection between multiple light-emitting element circuit boards and a control circuit board. A recent trend of reducing the pitch of arrangement of light-emitting elements increases the demand of size reduction of the connector in the longitudinal direction thereof.

CITATION LIST

Patent Literature

PTL 1

Japanese Patent Application Laid-Open No. 2005-317262

PTL 2

Japanese Patent Application Laid-Open No. H2-295077

SUMMARY OF INVENTION

Technical Problem

The spring for the connector requires to have a certain spring length to provide appropriate elastic forces. The connector having the metal-stamping spring tends to be long longitudinally because the metal-stamping spring has a linear shape and it is necessary to provide a sufficient length between the contact point and the base of the spring.

In the trend of the size reduction, the thickness of the counterpart contact is also reduced. In the case of the contact having the double-sided contact structure, the amount of displacement of each spring arm is determined by the thickness of the counterpart contact. In general, a minimum width to be formed by pressing (stamping) needs to be equal to or larger than the thickness of the plate. If the difference between the minimum width and the plate thickness is small, a required amount of displacement cannot be obtained.

The present invention provides a contact that can provide required elastic forces and enables size reduction when necessary even though the contact is a metal-stamping spring type, which is easy to manufacture. With the contact, a required amount of displacement can be obtained even if a counterpart contact is too thin to meet with displacement requirements. The present invention also provides a connector.

Solution to Problem

A contact of the present disclosure is a contact configured to be electrically connected to a counterpart contact, the contact comprising: a first contact arm and a second contact arm that are bifurcated at a bifurcation base, wherein the first contact arm comprises a first contact point formed thereon, the second contact arm comprises a second contact point formed thereon, the first and the second contact points come into contact with respective surfaces of the counterpart contact when the counterpart contact is inserted between the first and the second contact arms, at least one of the first and/or the second contact arms is configured to be displaced in a direction orthogonal to a thickness direction of the contact, and the at least one of the first and/or the second contact arms comprises a first elastic portion having elasticity and comprises a bent portion in the thickness direction at a position between the bifurcation base and a corresponding one of the first and the second contact points.

Further, in the contact of the present invention, the bent portion has a shape like a letter L, like a letter U, like a combination of the letter L and the letter U, or like a hat.

Further, in the contact of the present invention, in a development state of the contact, the first and the second contact arms have different lengths, and the bent portion is formed so as to adjust an extra length in such a manner that the first and the second contact points oppose each other in a direction of the first and the second contact points being displaced.

Further, in the contact of the present invention, a distance between the first and the second contact points in a direction of the first and the second elastic portions being displaced is smaller than a thickness of the contact in some cases.

Further, in the contact of the present invention, the first and the second contact points comprise respective protrusions that oppose each other, and the protrusions comprise respective guiding portions each of which is positioned in a direction set between a direction from a corresponding one of the first and the second contact points to the bifurcation base and the thickness direction of the contact.

A connector of the present invention is a connector configured to be electrically connected to a counterpart connector, the connector comprising: the contact of the present invention, the contact coming into electrical contact with a counterpart contact of the counterpart connector.

Advantageous Effects of Invention

The present invention can provide a contact that has a bent portion shaped like the letter L, like the letter U, like a combination of the letters L and U, or like a hat at a position between the bifurcated base and the contact point. The contact can be fit in a limited space in a connector and can provide sufficient elastic forces. Note that the bent portion does not necessarily have a 90-degree bend at the base thereof.

The contact points are disposed at the same position even if the first contact arm and the second contact arm of the contact have different lengths and shapes, which can prevent the rotation moment from acting on the counterpart contact.

DESCRIPTION OF EMBODIMENTS

Figure 1:
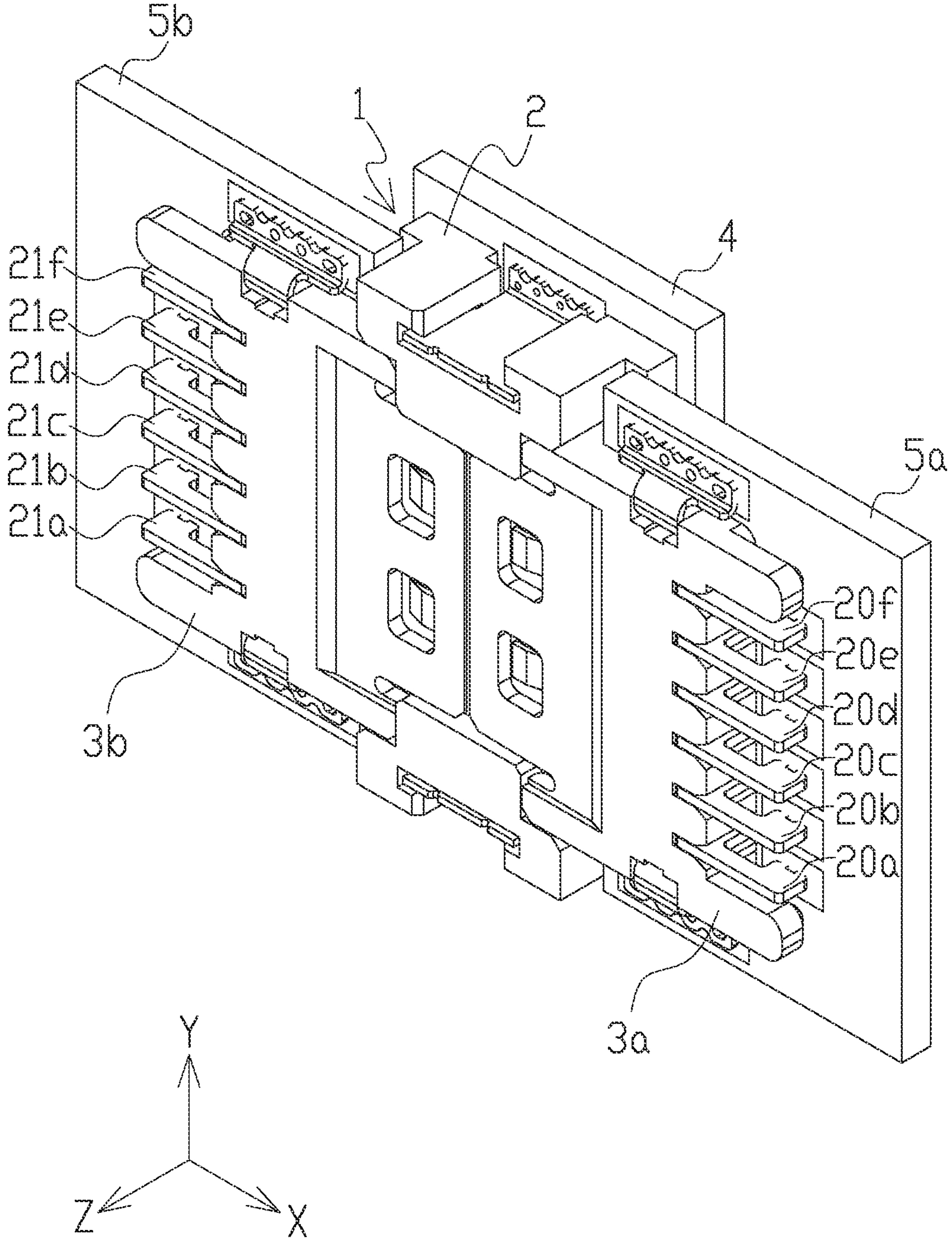
FIG. 1 is a perspective view illustrating a structure of a board-to-board connector according to Embodiment 1.
Figure 2A:
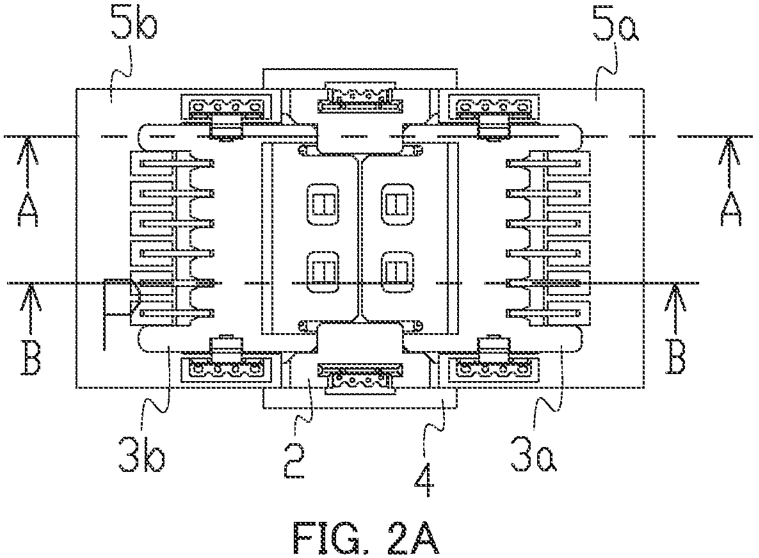
FIGS. 2A to 2E are views illustrating the structure of the board-to-board connector according to Embodiment 1.
Figure 2B:
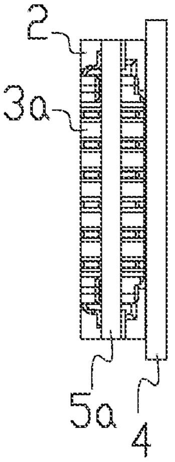
Figure 2C:
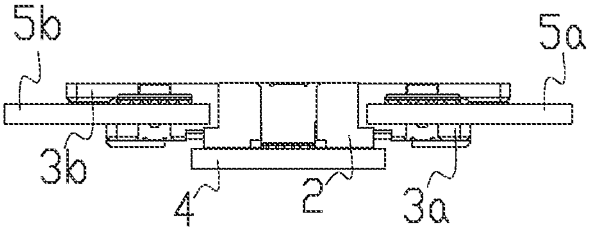
Figure 2D:
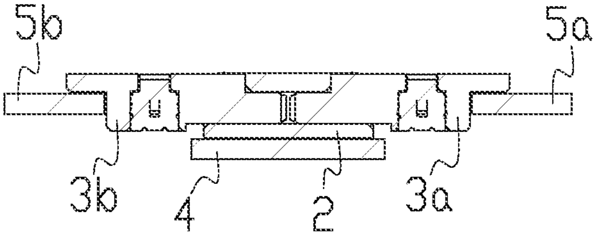
Figure 2E:
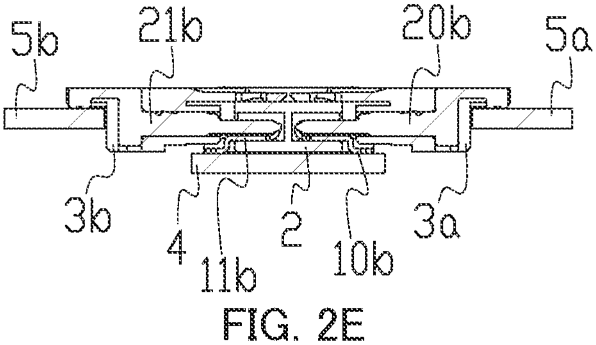
Figure 3:
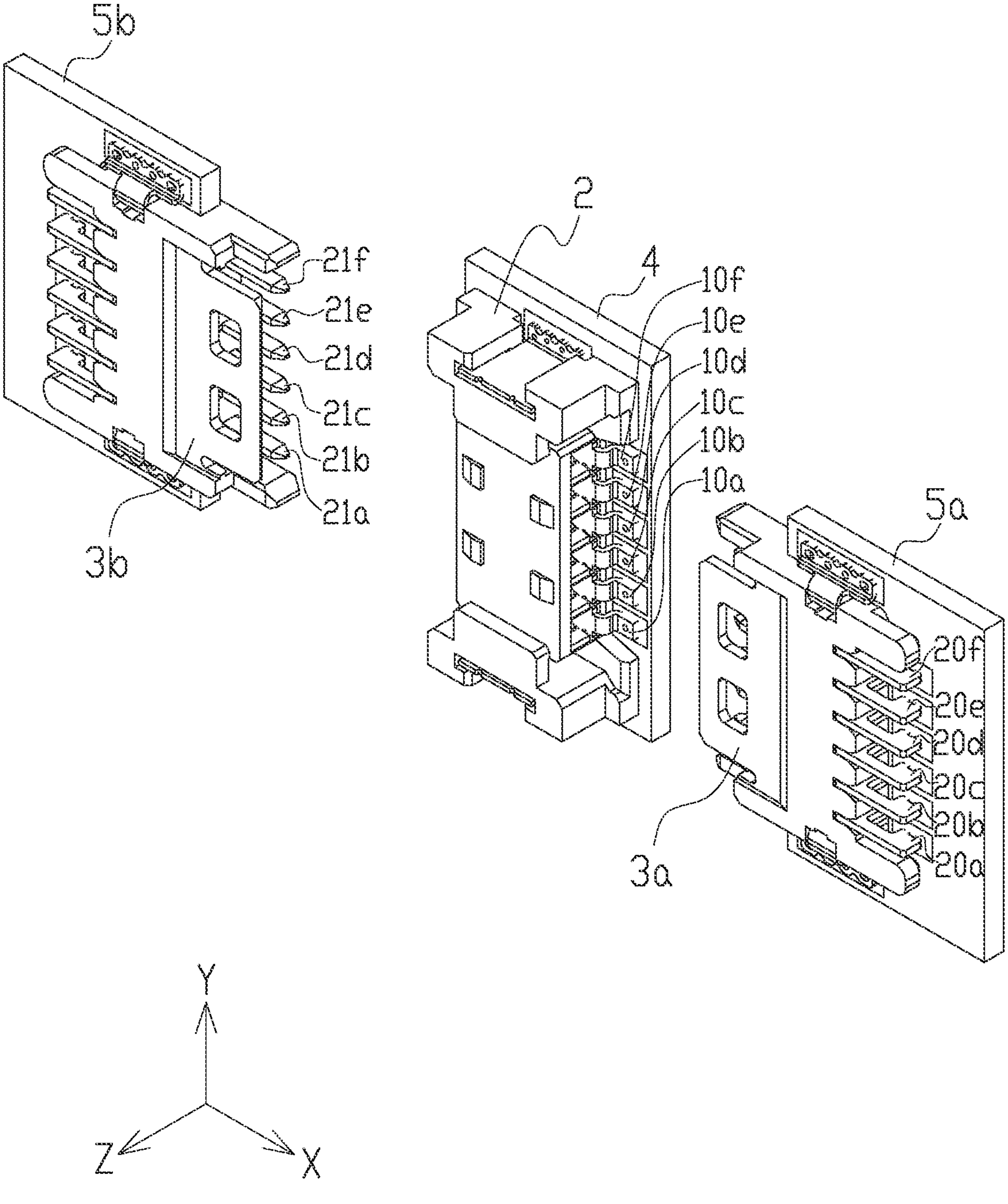
FIG. 3 is an exploded view illustrating the structure of the board-to-board connector according to Embodiment 1.
Figures 4A, 4B, 4C, 4D:
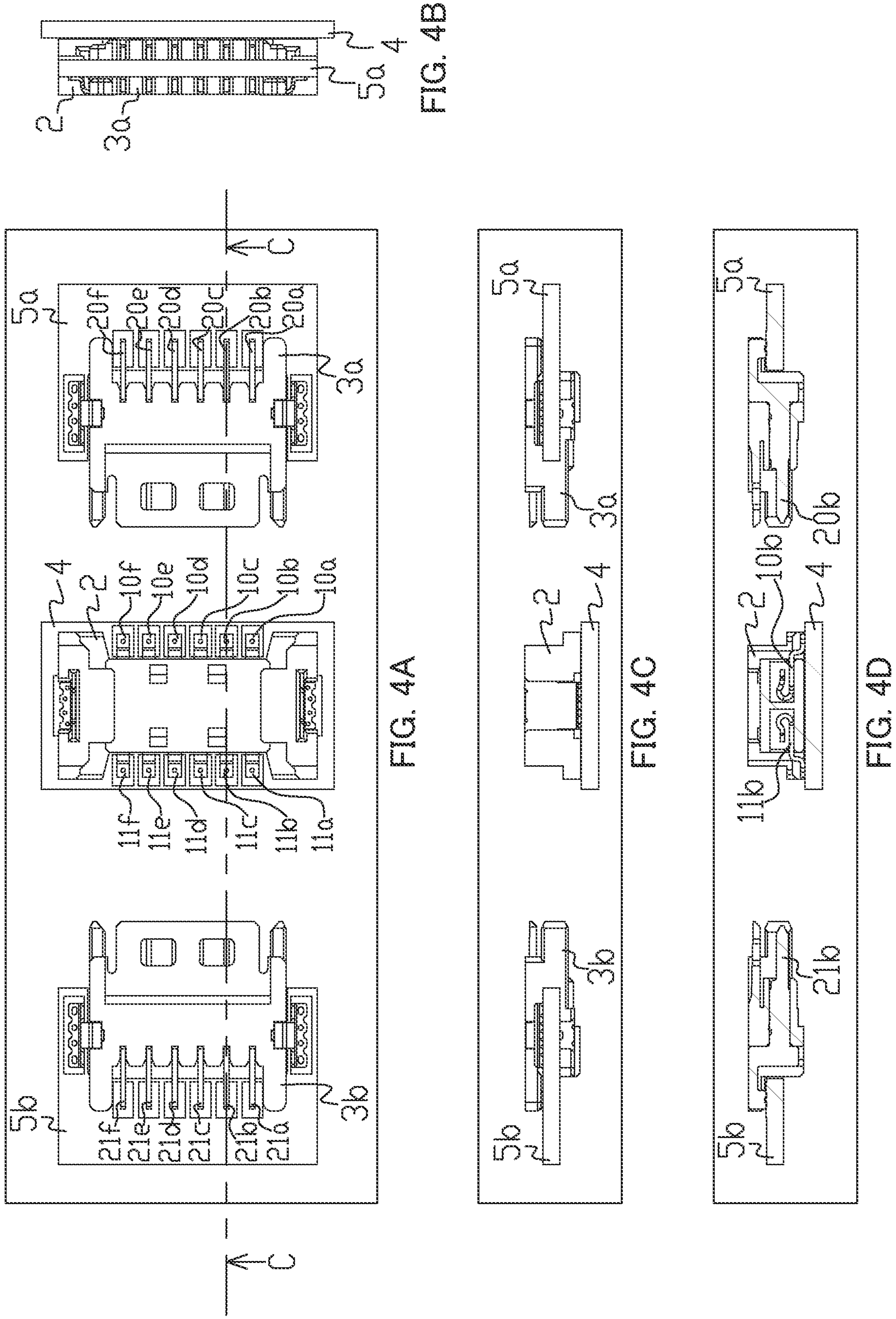
FIGS. 4A to 4D are exploded views illustrating the structure of the board-to-board connector according to Embodiment 1.

A board-to-board connector according to Embodiment 1 of the present invention will be described with reference to the drawings. The board-to-board connector of Embodiment 1 is a connector to be used for a LED backlight module (lighting module) of a liquid crystal display, which mainly illuminates the liquid crystal screen from behind. FIG. 1 is a perspective view illustrating a structure of the board-to-board connector according to Embodiment 1. FIG. 2A is a plan view illustrating the structure of the board-to-board connector of Embodiment 1. FIG. 2B is a side view illustrating the structure of the board-to-board connector according to Embodiment 1. FIG. 2C is a front view illustrating the structure of the board-to-board connector of Embodiment 1. FIG. 2D is a cross section taken along line A-A in FIG. 2A. FIG. 2E is a cross section taken along line B-B in FIG. 2A. FIG. 3 is an exploded view illustrating the structure of the board-to-board connector of Embodiment 1. FIG. 4A is an exploded plan view illustrating the structure of the board-to-board connector of Embodiment 1. FIG. 4B is an exploded side view illustrating the structure of the board-to-board connector of Embodiment 1. FIG. 4C is an exploded front view illustrating the structure of the board-to-board connector of Embodiment 1. FIG. 4D is a cross section taken along line C-C in FIG. 4A. Board-to-board connector 1 electrically connects relay circuit board 4 to light-emitting element circuit boards 5*a* and 5*b*. As illustrated in FIG. 1, board-to-board connector 1 includes receptacle connector 2 and two plug connectors 3*a* and 3*b*. Receptacle connector 2 is mounted on relay circuit board 4. Plug connector 3*a* is mounted on light-emitting element circuit board 5*a*, and plug connector 3*b* is mounted on light-emitting element circuit board 5*b*. In the following descriptions, the XYZ orthogonal coordinate system is defined as illustrated in FIG. 1, and positional relationships of members, for example, will be described with reference to the orthogonal coordinate system. The X-axis extends in a direction in which receptacle connector 2 engages plug connectors 3*a* and 3*b*. The Y-axis extends in the longitudinal direction of the relay circuit board 4. The Z-axis extends in a direction orthogonal to the mounting surfaces of relay circuit board 4 and light-emitting element circuit boards 5*a* and 5*b*.

Relay circuit board 4 to be used for the LED backlight module has a belt-like shape of which the longitudinal direction is parallel to the Y direction. Relay circuit board 4 has multiple receptacle connectors 2 mounted thereon at predetermined intervals in the Y direction. In FIGS. 1 to 5, relay circuit board 4 is illustrated so as to have a length shorter than reality in order to facilitate a clear understanding of the structure of board-to-board connector 1. Similarly, light-emitting element circuit boards 5*a* and 5*b* to be used for the LED backlight module have belt-like shapes of which the longitudinal directions are parallel to the X direction. Light-emitting element circuit boards 5*a* and 5*b* each have multiple light-emitting elements mounted thereon at a predetermined distance in the X direction. In FIGS. 1 to 4 and FIG. 8, light-emitting element circuit boards 5*a* and 5*b* are illustrated so as to have lengths shorter than reality in order to facilitate a clear understanding of the structure of board-to-board connector 1.

Figure 5:
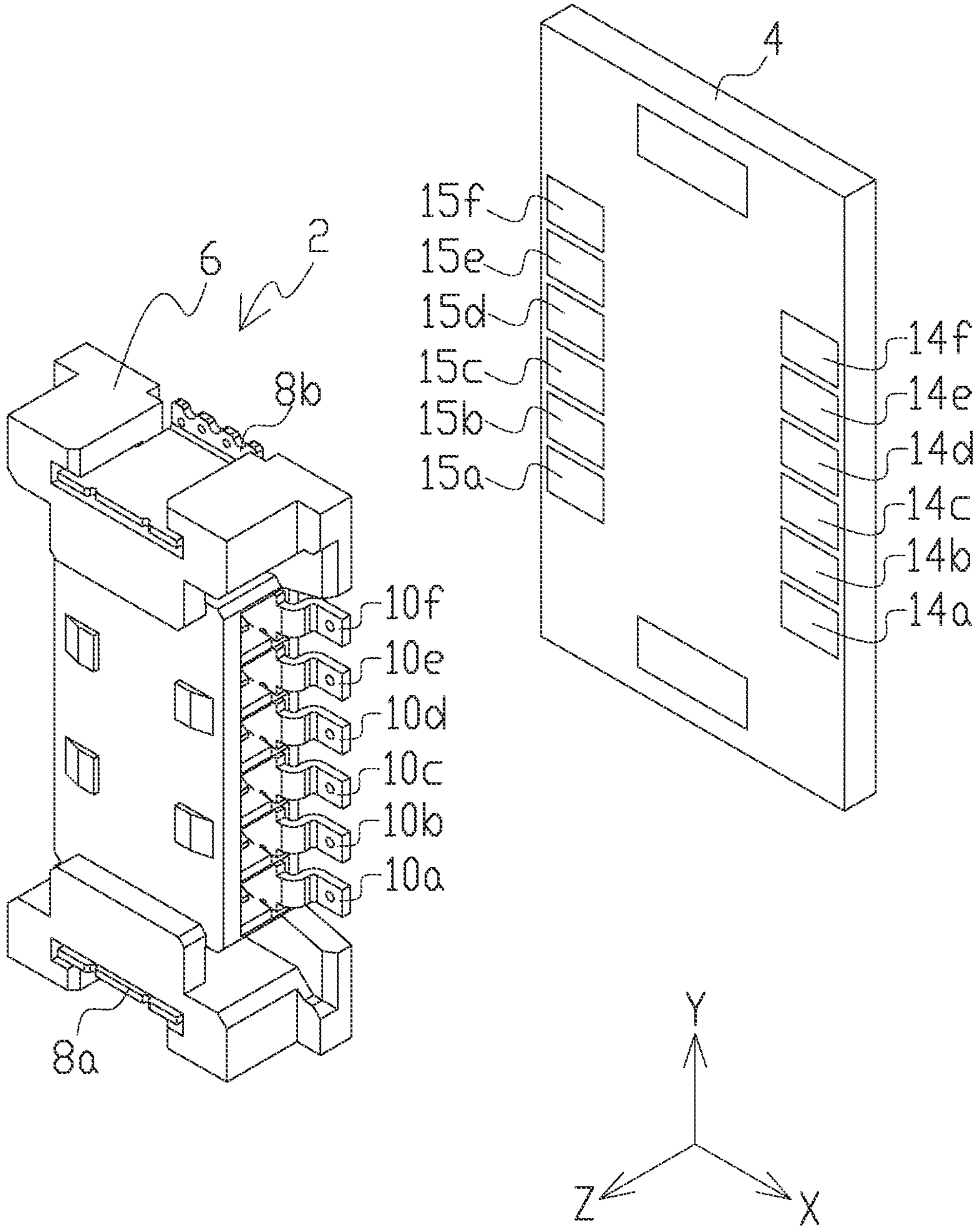
FIG. 5 is a perspective view illustrating structures of a relay circuit board and a receptacle connector to be mounted on the relay circuit board according to Embodiment 1.
Figure 6:
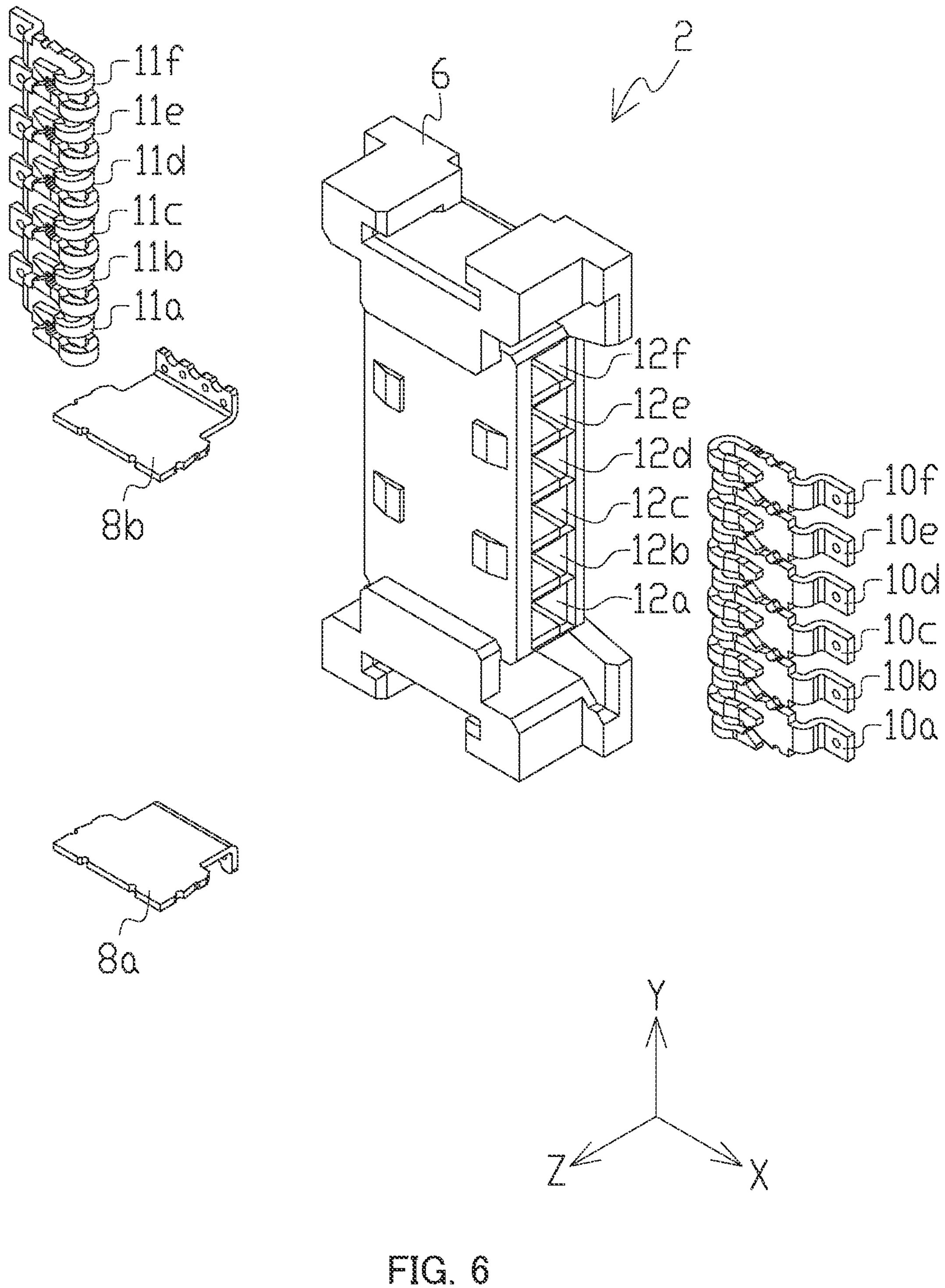
FIG. 6 is an exploded view illustrating the structure of the receptacle connector according to Embodiment 1.

Receptacle connector 2 to be mounted on relay circuit board 4 receives and engages plug connector 3*a* in a direction from the +X side to the −X side in the X direction, while receptacle connector 2 receives and engages plug connector 3*b* in a direction from the −X side to the +X side. Plug connectors 3*a* and 3*b* may engage receptacle connector 2 in oblique directions. Relay circuit board 4 relays an electrical link between a control board (power supply board) (not illustrated) and light-emitting element circuit boards 5*a* and 5*b*. FIG. 5 is a perspective view illustrating a state before receptacle connector 2 is mounted on relay circuit board 4, and FIG. 6 is an exploded view illustrating receptacle connector 2. As illustrated in FIGS. 1 to 6, receptacle connector 2 includes insulator 6, two fitting nails (fixation nails) 8*a* and 8*b*, six first contacts (terminals) 10*a* to 10*f*, and six second contacts (terminals) 11*a* to 11*f*.

First contacts 10*a* to 10*f* and second contacts 11*a* to 11*f* are disposed such that first contacts 10*a* to 10*f* oppose second contacts 11*a* to 11*f* in the X direction. First contacts 10*a* to 10*f* are arranged equidistantly in the Y direction and are embedded in insulator 6. First contacts 10*a* to 10*f* are disposed in respective first receiving cavities 12*a* to 12*f* that are positioned in insulator 6 so as to face the +X side in the X direction. The ends of first contacts 10*a* to 10*f* that face the +X side are connected to respective ones of six first pads 14*a* to 14*f* formed on a surface of relay circuit board 4 when receptacle connector 2 is mounted on relay circuit board 4. The ends of first contacts 10*a* to 10*f* near the −X side are connected to respective ones of six contacts 20*a* to 20*f* of plug connector 3*a* when receptacle connector 2 engages plug connector 3*a*.

Second contacts 11*a* to 11*f* are arranged equidistantly in the Y direction and are embedded in insulator 6. Second contacts 11*a* to 11*f* are disposed in respective ones of six second receiving cavities (not illustrated) that are positioned in insulator 6 so as to face the −X side in the X direction. The ends of second contacts 11*a* to 11*f* that face the −X side are connected to respective ones of six second pads 15*a* to 15*f* formed on the surface of relay circuit board 4 when receptacle connector 2 is mounted on relay circuit board 4. The ends of second contacts 11*a* to 11*f* near the +X side are connected to respective ones of six contacts 21*a* to 21*f* of plug connector 3*b* when receptacle connector 2 engages plug connector 3*b*.

Figure 7:
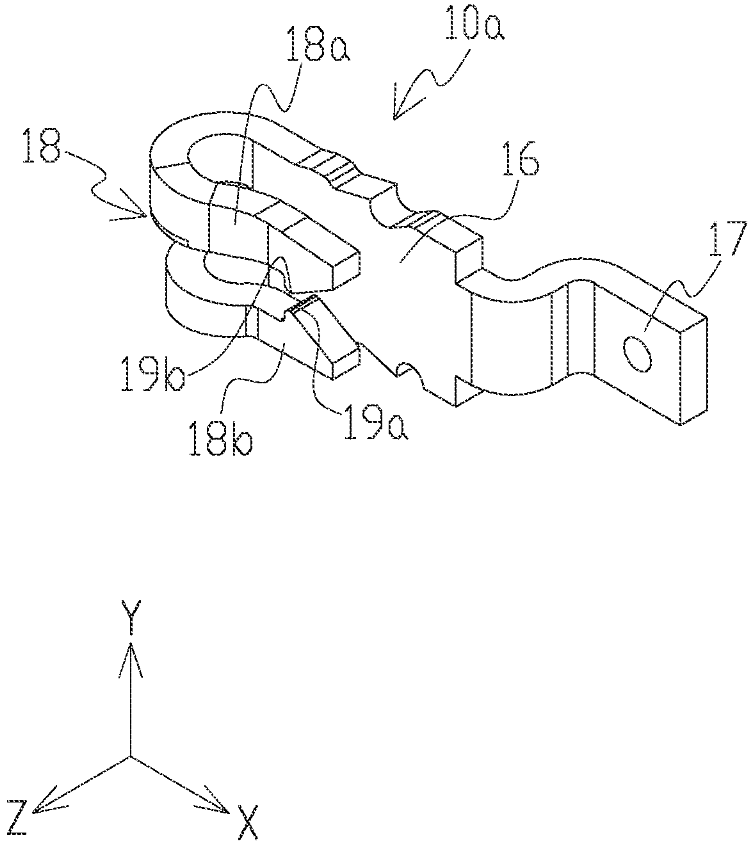
FIG. 7 is a perspective view illustrating a structure of a contact as an element of the receptacle connector according to Embodiment 1.
Figure 8A:
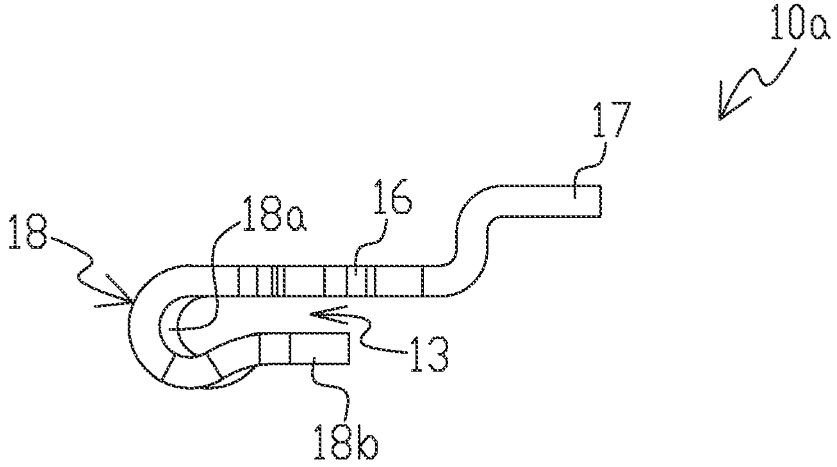
FIGS. 8A to 8E are six views illustrating the structure of the contact as the element of the receptacle connector according to Embodiment 1.
Figure 8D:
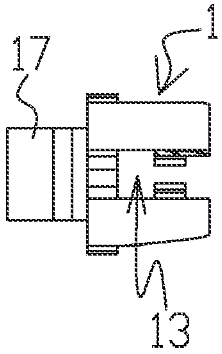
Figure 8B:
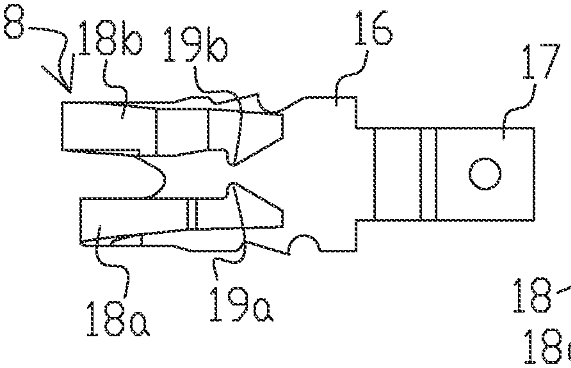
Figure 8E:
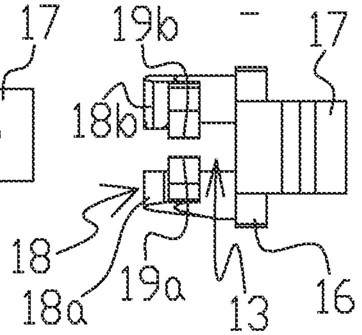
Figure 8C:
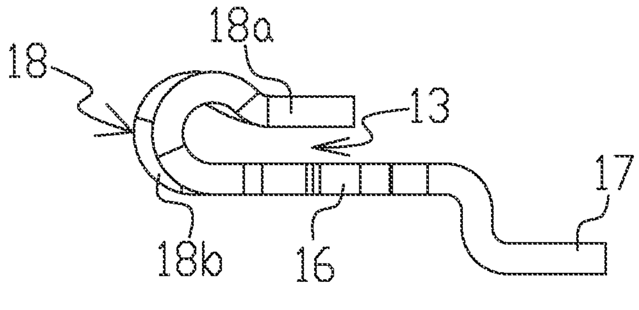
Figure 9A:
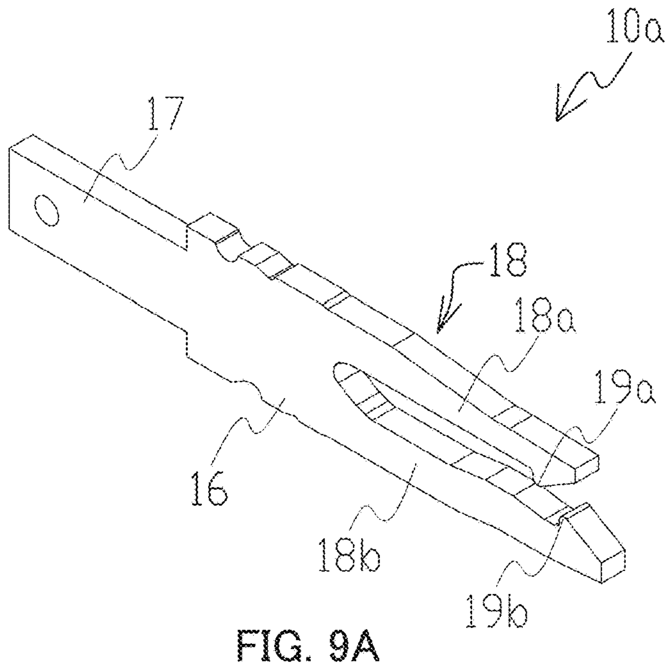
FIGS. 9A to 9D are developments of the contact as the element of the receptacle connector according to Embodiment 1.
Figure 9B:
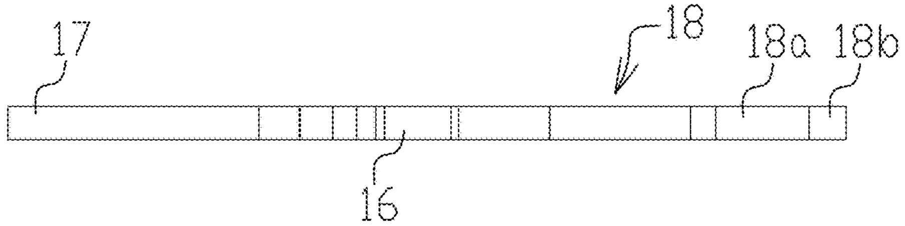
Figure 9C:
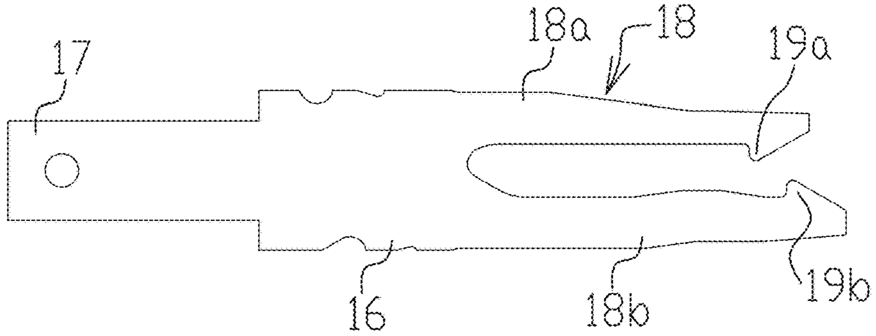
Figure 9D:
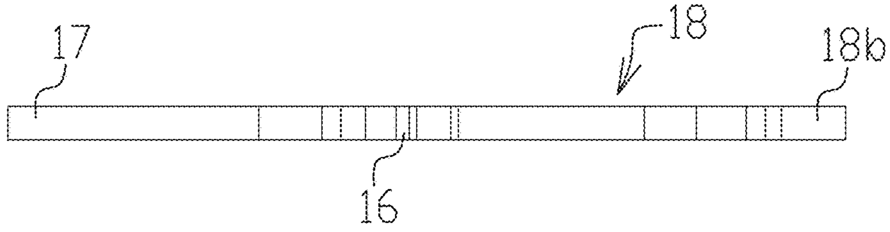

FIG. 7 is a perspective view illustrating a structure of first contact 10*a*. FIG. 8A is a plan view illustrating the structure of first contact 10*a*. FIG. 8B is a front view illustrating the structure of first contact 10*a*. FIG. 8C is a bottom view illustrating the structure of first contact 10*a*. FIG. 8D is a left side view illustrating the structure of first contact 10*a*. FIG. 8E is a right side view illustrating the structure of first contact 10*a*. FIGS. 9A to 9D are developments of first contact 10*a* (before first contact 10*a* is bent), in which FIG. 9A is a perspective view, FIG. 9B is a plan view, FIG. 9C is a front view, and FIG. 9D is a bottom view. Note that each shape of first contacts 10*b* to 10*f* is the same as that of first contact 10*a*. Each shape of second contacts 11*a* to 11*f* is also the same as that of first contact 10*a*. First contact 10*a* and each of second contacts 11*a* to 11*f* are shaped in line symmetry with respect to the center line of receptacle connector 2 extending in the Y direction.

First contact 10*a* has central portion 16 that is disposed on a surface in first receiving cavity 12*a*, the surface being closer to the −Z side in the Z direction. First contact 10*a* is bent toward the −Z side (toward relay circuit board 4) at the end of central portion 16 that faces the +X side and is further bent toward the +X side. Thus, mounting portion 17 is formed at the end of first contact 10*a*. The surface of mounting portion 17 that faces relay circuit board 4 is joined to first pad 14*a* of relay circuit board 4, for example, by soldering. First contact 10*a* has elastic portion 18 that has elasticity and extends in a bifurcated manner (i.e., is branched) from an end of central portion 16 that faces the −X side. Elastic portion 18 is bent toward the +Z side at the end of central portion 16 that faces-X side and is further bent toward the +X side. Accordingly, elastic portion 18 has a portion shaped like the letter U. Elastic portion 18 has first elastic portion (first contact arm) 18*a* and second elastic portion (second contact arm) 18*b* as bifurcated portions of elastic portion 18. First contact point 19*a* and second contact point 19*b* are formed at respective ends of first elastic portion 18*a* and second elastic portion 18*b*. First elastic portion 18*a* and second elastic portion 18*b* serve as nipping portions that nip contact 20*a* of plug connector 3*a* when receptacle connector 2 engages plug connector 3*a*. First contact point 19*a* is formed on first elastic portion 18*a*, which is one of the bifurcated portions, and second contact point 19*b* is formed on second elastic portion 18*b*, which is the other one of the bifurcated portions. First contact point 19*a* and second contact point 19*b* nip contact 20*a* in the Y direction and thereby electrically connect first contact 10*a* to contact 20*a*. Here, the end of central portion 16 that faces the −X side (i.e., the base from which the bifurcated portions starts) functions as the support portion (fixation portion) of elastic portion 18. Elastic portion 18 is bent like the letter U, and a space formed between central portion 16 and first and second contact points 19*a* and 19*b* functions as an elastic displacement space for elastic portion 18. Accordingly, elastic forces acting in the Y direction cause first contact point 19*a* and second contact point 19*b* to nip contact 20*a* of plug connector 3*a* and thereby electrically connect first contact 10*a* to contact 20*a*. In other words, the length of first contact 10*a* in the X direction can be reduced without sacrificing the function of elastic portion 18 serving as an elastic body and without sacrificing the spring length of elastic portion 18.

In addition, as illustrated in FIG. 9, first elastic portion 18*a* and second elastic portion 18*b* have different forms, such as different shapes, thicknesses (plate thicknesses), or widths. First contact point 19*a* and second contact point 19*b* do not oppose each other before elastic portion 18 is bent into the U-shaped portion. First contact point 19*a* and second contact point 19*b* oppose each other after bending. In general, when a contact is formed by pressing (stamping), the gap between first elastic portion 18*a* and second elastic portion 18*b* need to be equal to or greater than the thickness (plate thickness) of the contact. If first elastic portion 18*a* and second elastic portion 18*b* had the same form, the gap between first contact point 19*a* and second contact point 19*b* would need to be equal to or greater than the plate thickness, and accordingly the plate thickness of contact 20*a* would need to be greater than the plate thickness of first contact 10*a*. In other words, the plate thickness of contact 20*a* would be restricted although it is desired to set the plate thickness of contact 20*a* freely (to set it thinner if possible). First elastic portion 18*a* and second elastic portion 18*b*, however, are made different in shape, and first contact point 19*a* and second contact point 19*b* are positioned differently from each other, which enables the gap between first contact point 19*a* and second contact point 19*b* to be smaller while conforming the requirements of pressing. In other words, the plate thickness of contact 20*a* can be set freely (set to be thinner).

In the longitudinal direction of the contact (in the X direction), the length of first elastic portion 18*a* is greater than the length of second elastic portion 18*b*. The U-shaped portion (bent portion) functions as a length adjustment portion that absorb an extra length of first elastic portion 18a relative to the length of second elastic portion 18b. More specifically, the U shape of first elastic portion 18a is made larger than the U shape of second elastic portion 18b, thereby absorbing the extra length of first elastic portion 18a.

First contact point 19a and second contact point 19b do not oppose each other before elastic portion 18 is bent like the letter U, and after bending, first contact point 19a and second contact point 19b are made to oppose each other. This generates a difference in the amount of spring displacement (spring load) between first elastic portion 18a and second elastic portion 18b. In order to eliminate the difference, at least one of the plate thickness and the width of first elastic portion 18a that is longer in the longitudinal direction of first contact 10a (in the X direction) is made greater than the corresponding one of the plate thickness and the width of second elastic portion 18b, which is shorter than first elastic portion 18a. Put another way, in order to balance and equalize respective nipping forces of first contact point 19a and second contact point 19b, at least one of the plate thickness and the width of first and second elastic portions 18a and 18b is to be adjusted.

Figure 10:
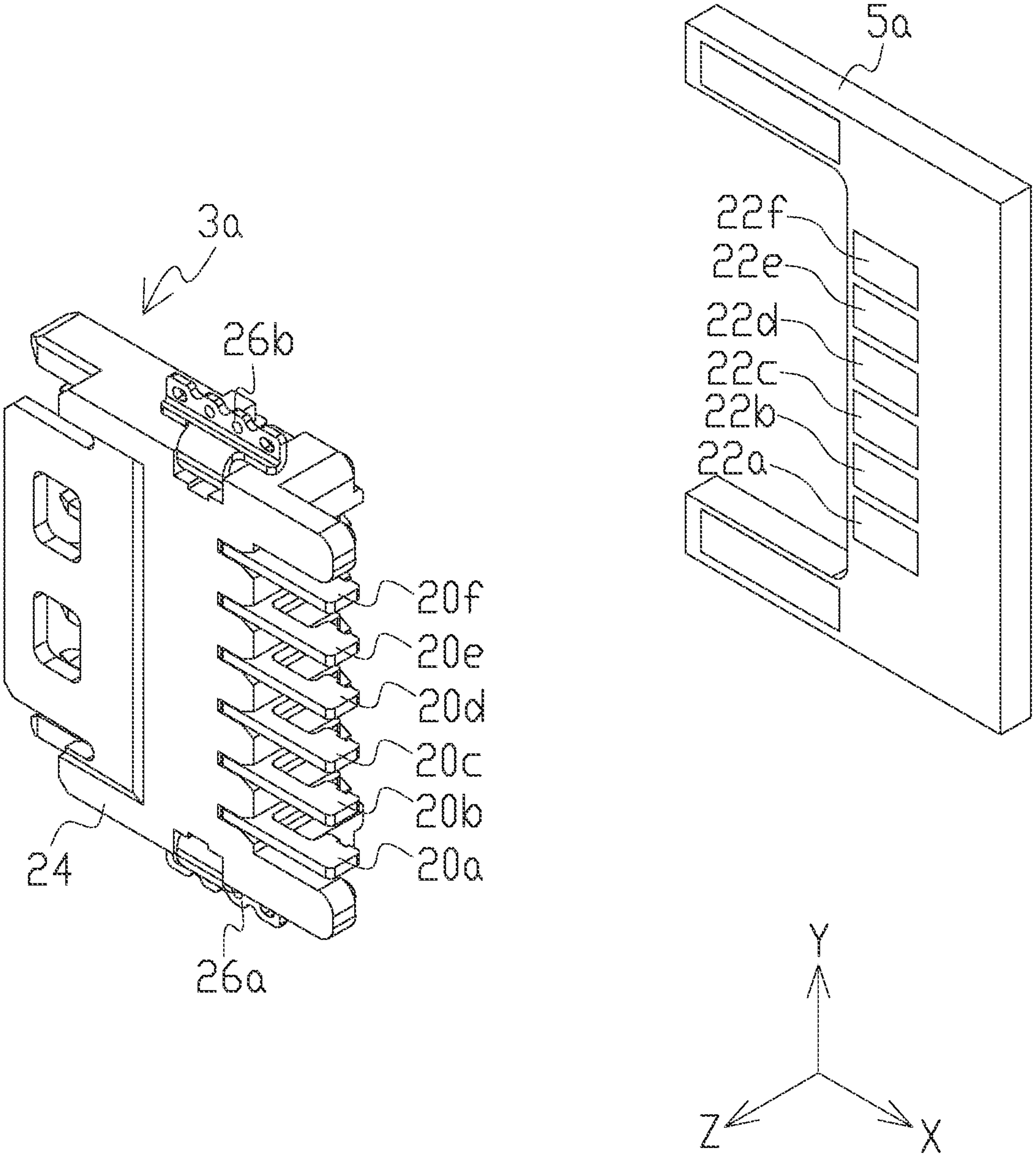
FIG. 10 is a perspective view illustrating structures of a light-emitting element circuit board and a plug connector to be mounted on the light-emitting element circuit board according to Embodiment 1.
Figure 11:
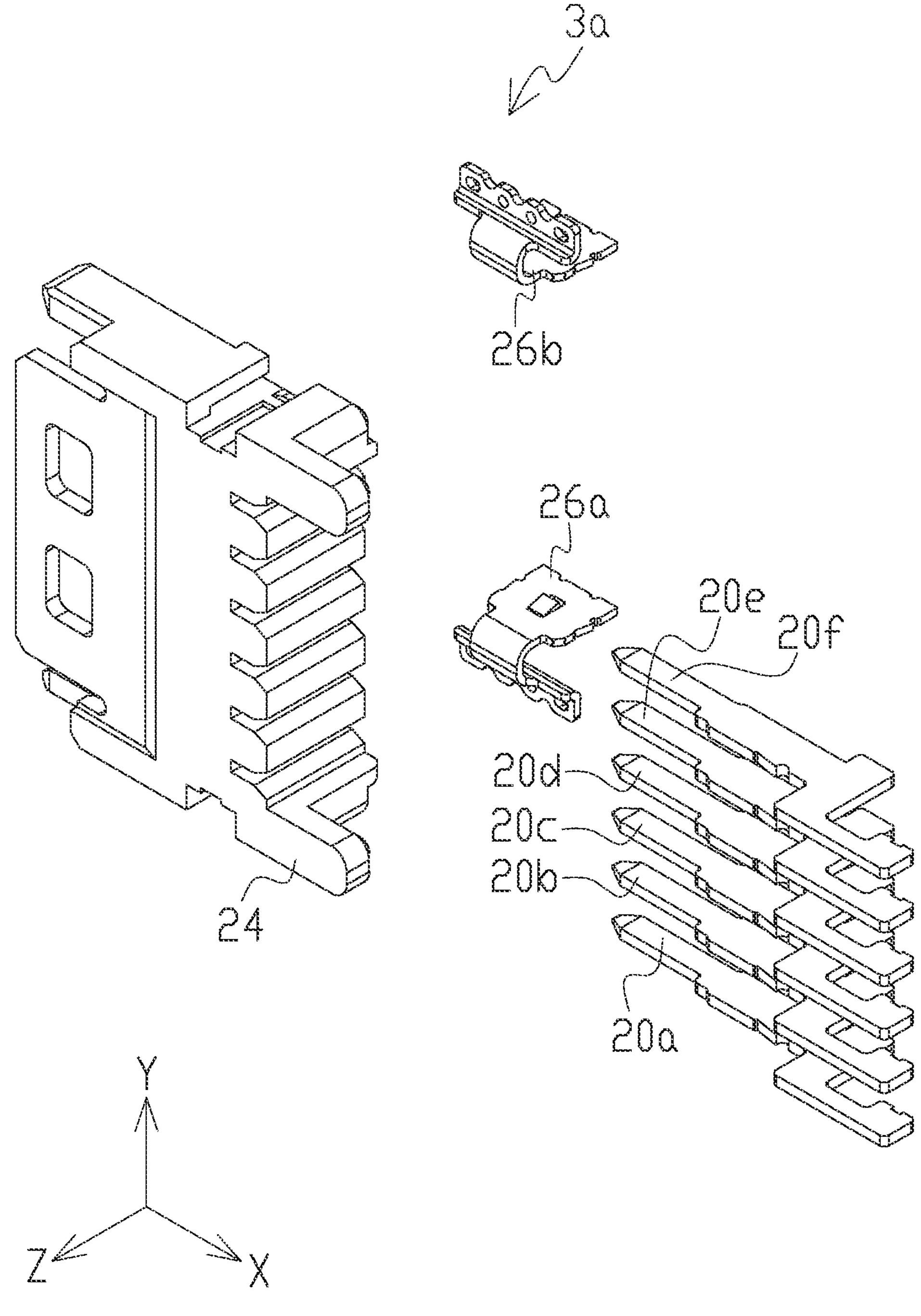
FIG. 11 is an exploded view illustrating the structure of the plug connector according to Embodiment 1.

FIG. 10 is a perspective view illustrating a state before plug connector 3a is mounted on light-emitting element circuit board 5a, and FIG. 11 is an exploded view illustrating plug connector 3a. Note that the structure of plug connector 3b is the same as that of plug connector 3a. Plug connector 3b and plug connector 3a are shaped in line symmetry with respect to the center line of receptacle connector 2 extending in the Y direction. The structure of light-emitting element circuit board 5b is the same as that of light-emitting element circuit board 5a. Light-emitting element circuit board 5b and light-emitting element circuit board 5a are shaped in line symmetry with respect to the center line of receptacle connector 2 extending in the Y direction.

As illustrated in FIGS. 10 and 11, plug connector 3a includes insulator 24, two fitting nails (fixation nails) 26a and 26b, and six contacts 20a to 20f. Contacts 20a to 20f are arranged equidistantly in the Y direction and are embedded in insulator 24. The ends of contacts 20a to 20f that face the +X side are connected to respective ones of six pads 22a to 22f formed on a surface of light-emitting element circuit board 5a when plug connector 3a is mounted on light-emitting element circuit board 5a. The ends of contacts 20a to 20f that face the −X side are connected to respective ones of six first contacts 10a to 10f of receptacle connector 2 when plug connector 3a engages receptacle connector 2.

The LED backlight module (lighting module) (not illustrated) includes multiple light-emitting elements (not illustrated), relay circuit board 4, multiple light-emitting element circuit boards 5a and 5b on which the multiple light-emitting elements are mounted, a rectangularly shaped mounting member (not illustrated) to be used for mounting of relay circuit board 4 and light-emitting element circuit boards 5a and 5b, and board-to-board connector 1 that electrically connects relay circuit board 4 to light-emitting element circuit board 5a and 5b. The liquid crystal display (display) (not illustrated) includes a liquid crystal panel (not illustrated), the LED backlight module disposed at the rear surface of the liquid crystal panel, and the control board (not illustrated) disposed at the rear surface of the LED backlight module.

Board-to-board connector 1 of Embodiment 1 includes receptacle connector 2 equipped with first contacts 10a to 10f (second contacts 11a to 11f) each having a U-shaped elastic body. Accordingly, each of first contacts 10a to 10f (second contacts 11a to 11f) can be made shorter to the extent of the length of the folded portion compared with an unfolded contact that extends linearly in the engagement direction, such as a tuning fork type contact (a contact that is made by stamping and can be elastically displaced in a direction orthogonal to the stamping direction, in other words, in a direction parallel to the plate surface) or compared with a box-shaped contact. In other words, the size of receptacle connector 2 in the engagement direction can be reduced at least to the extent of the length of the folded portion of each of first contacts 10a to 10f (second contacts 11a to 11f), which can thereby reduce the widthwise size of relay circuit board 4 on which receptacle connector 2 is mounted. In addition, board-to-board connector 1 equipped with the contacts of the present invention can be installed in a low-height or shallow-depth space where the connector having unfolded flat contacts cannot be installed.

Figure 12:
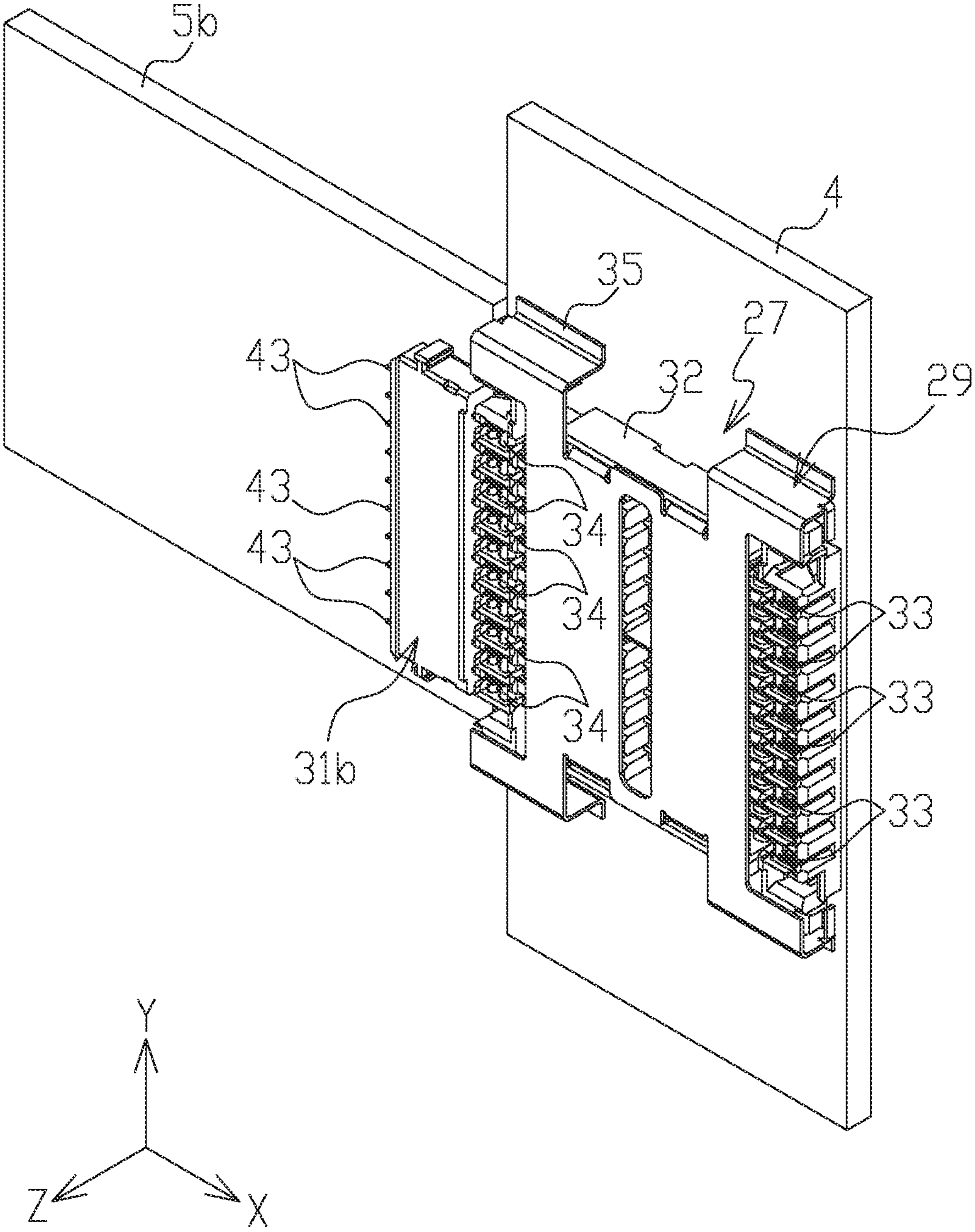
FIG. 12 is a perspective view illustrating a structure of a board-to-board connector according to Embodiment 2.
Figure 13A:
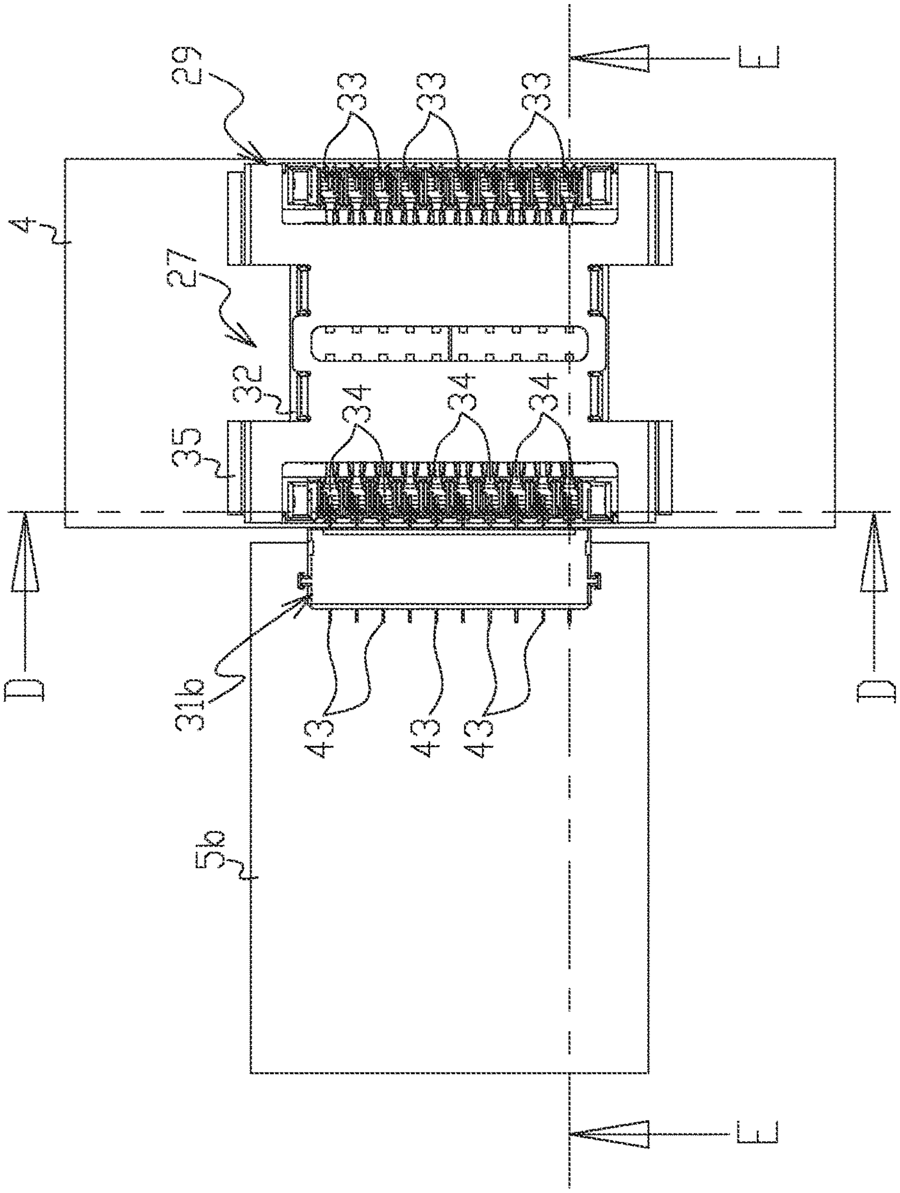
FIGS. 13A to 13C are views illustrating the structure of the board-to-board connector according to Embodiment 2.
Figure 13C:
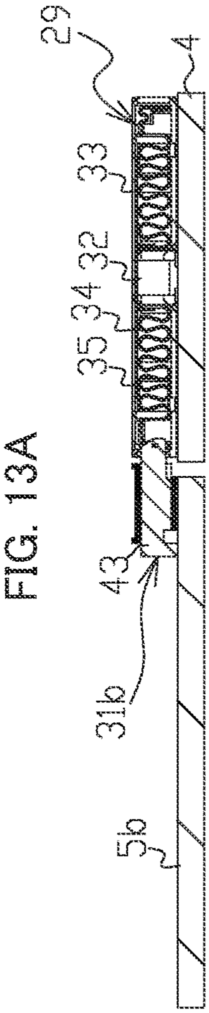
Figure 13B:
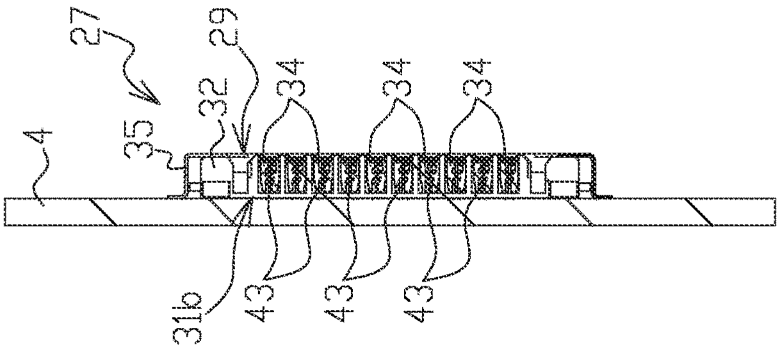

Next, a board-to-board connector according to Embodiment 2 of the present invention will be described with reference to the drawings. FIG. 12 is a perspective view illustrating a structure of the board-to-board connector of Embodiment 2. FIG. 13A is a plan view illustrating the structure of the board-to-board connector of Embodiment 2. FIG. 13B is a cross section taken along line D-D in FIG. 13A, and FIG. 13C is a cross section taken along line E-E in FIG. 13A. Board-to-board connector 27 electrically connects relay circuit board 4 to light-emitting element circuit board 5b and to another light-emitting element circuit board (not illustrated). Board-to-board connector 27 includes receptacle connector 29, plug connector 31b, and another plug connector (not illustrated). Receptacle connector 29 is mounted on relay circuit board 4. Plug connector 31b is mounted on light-emitting element circuit board 5b, and the other plug connector (not illustrated) is mounted on the other light-emitting element circuit board (not illustrated). In the following descriptions, as is the case for Embodiment 1, the XYZ orthogonal coordinate system is defined as illustrated in FIG. 12, and, for example, positional relationships of members will be described with reference to the orthogonal coordinate system.

Receptacle connector 29 to be mounted on relay circuit board 4 receives and engages plug connector 31b in a direction from the −X side to the +X side in the X direction, while receptacle connector 29 receives and engages the other plug connector (not illustrated) in a direction from the +X side to the −X side. As illustrated in FIGS. 12 and 13A to 13C, receptacle connector 29 includes insulator 32, ten first contacts (terminals) 33, ten second contacts (terminals) 34, and shell 35.

Ten first contacts 33 oppose ten second contacts 34 in the X direction. Ten first contacts 33 as well as ten second contacts 34 are arranged equidistantly in the Y direction and embedded in insulator 32. The ends of first contacts 33 that face the −X side are connected to first pads (not illustrated) formed on the relay circuit board 4. The ends of first contacts 33 that face the +X side are connected to the contacts of the other plug connector (not illustrated). The ends of the second contacts 34 that face the +X side are connected to second pads (not illustrated) formed on the relay circuit board 4. The ends of the second contacts 34 that face the −X side are connected to contacts 43 (see FIG. 12) of plug connector 31b.

Figure 14:
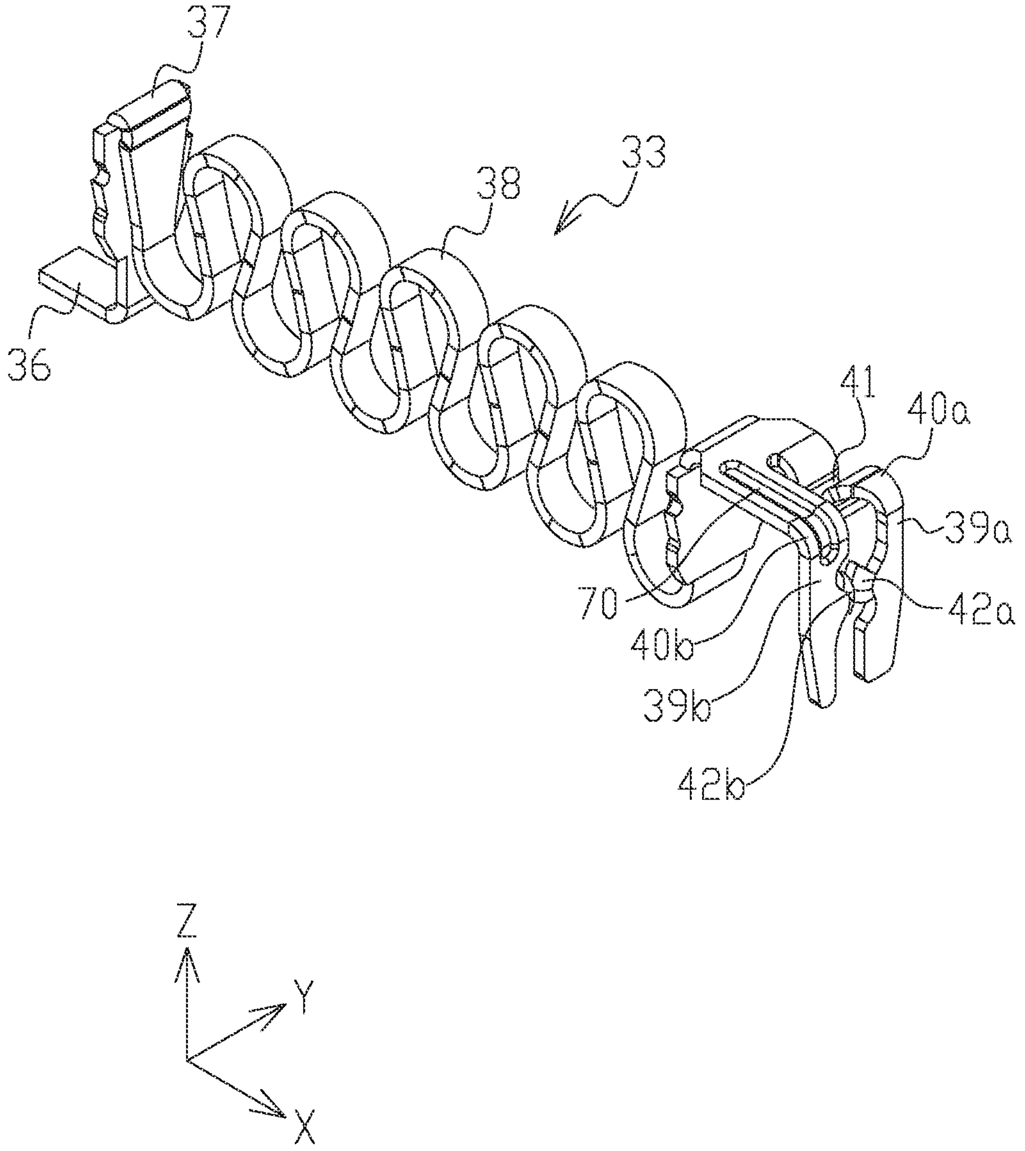
FIG. 14 is a perspective view illustrating a structure of a contact as an element of a receptacle connector according to Embodiment 2.
Figure 15A:
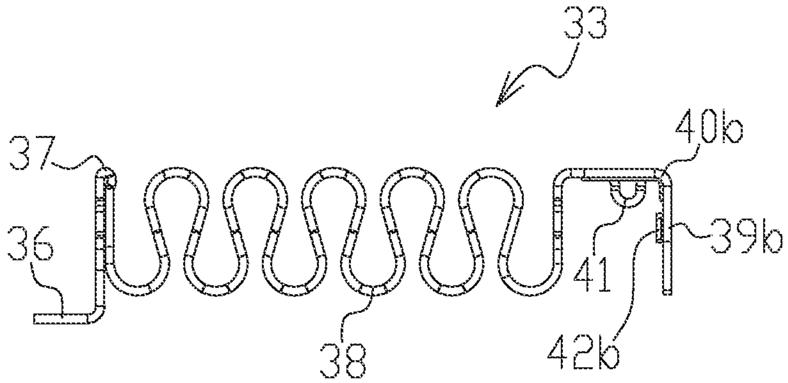
FIGS. 15A to 15E are views illustrating the structure of the contact as the element of the receptacle connector according to Embodiment 2.
Figure 15D:
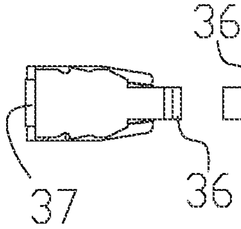
Figure 15B:
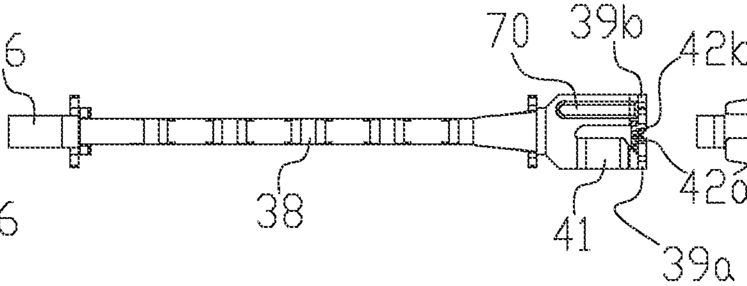
Figure 15E:
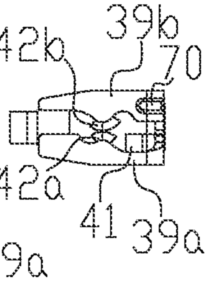
Figure 15C:
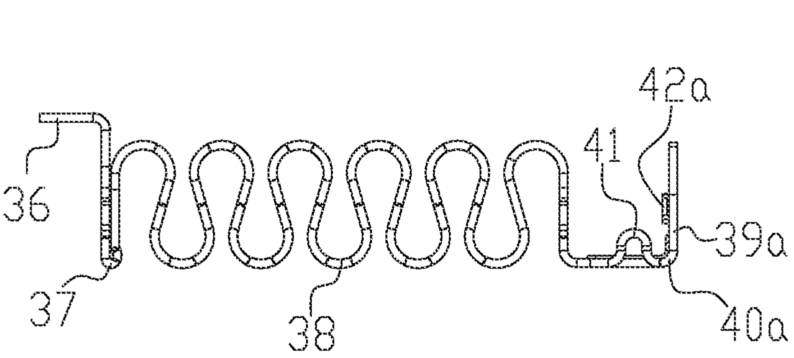
Figure 16:
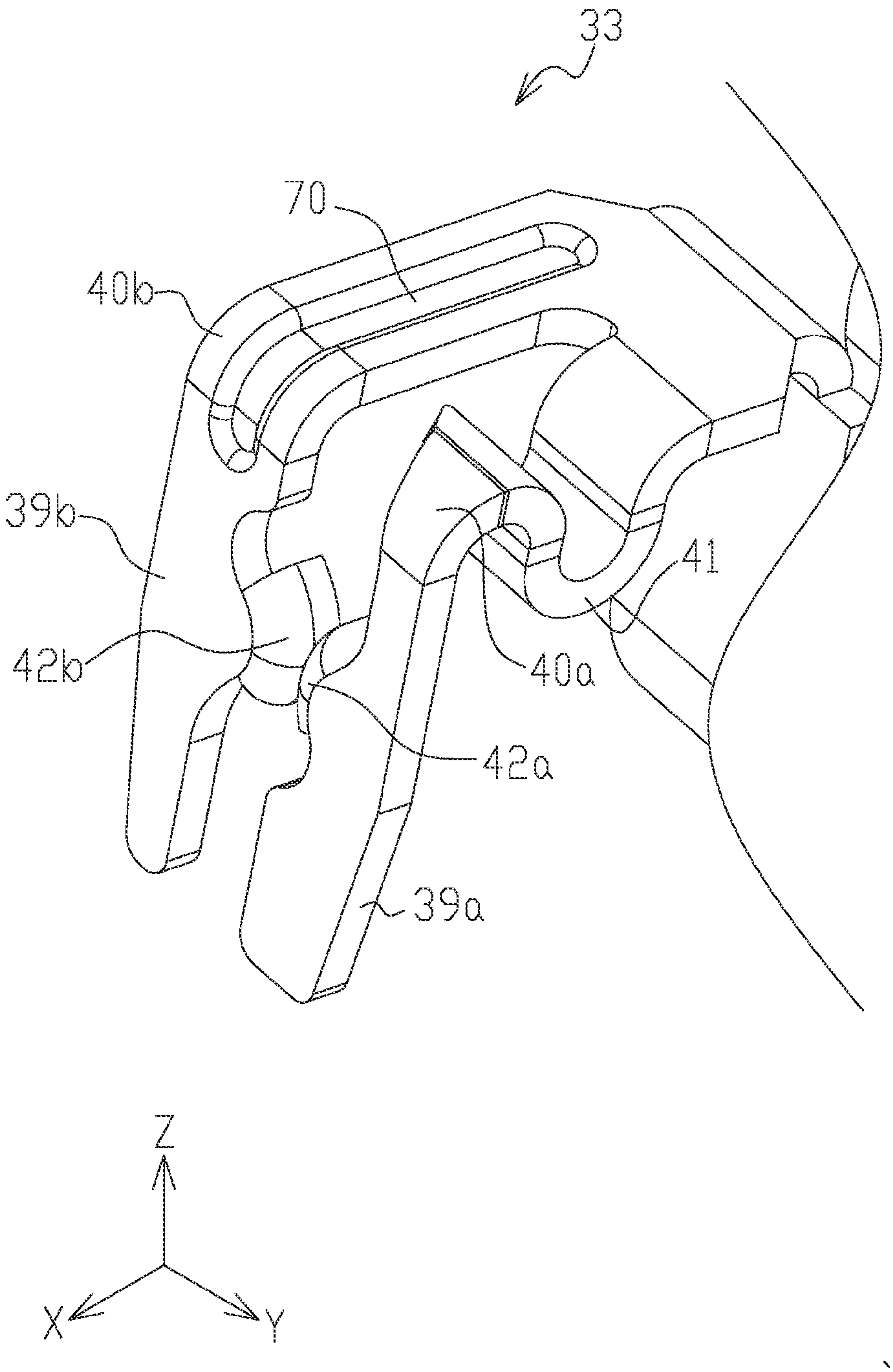
FIG. 16 is an enlarged view illustrating the structure of the contact as the element of the receptacle connector according to Embodiment 2.
Figure 17A:
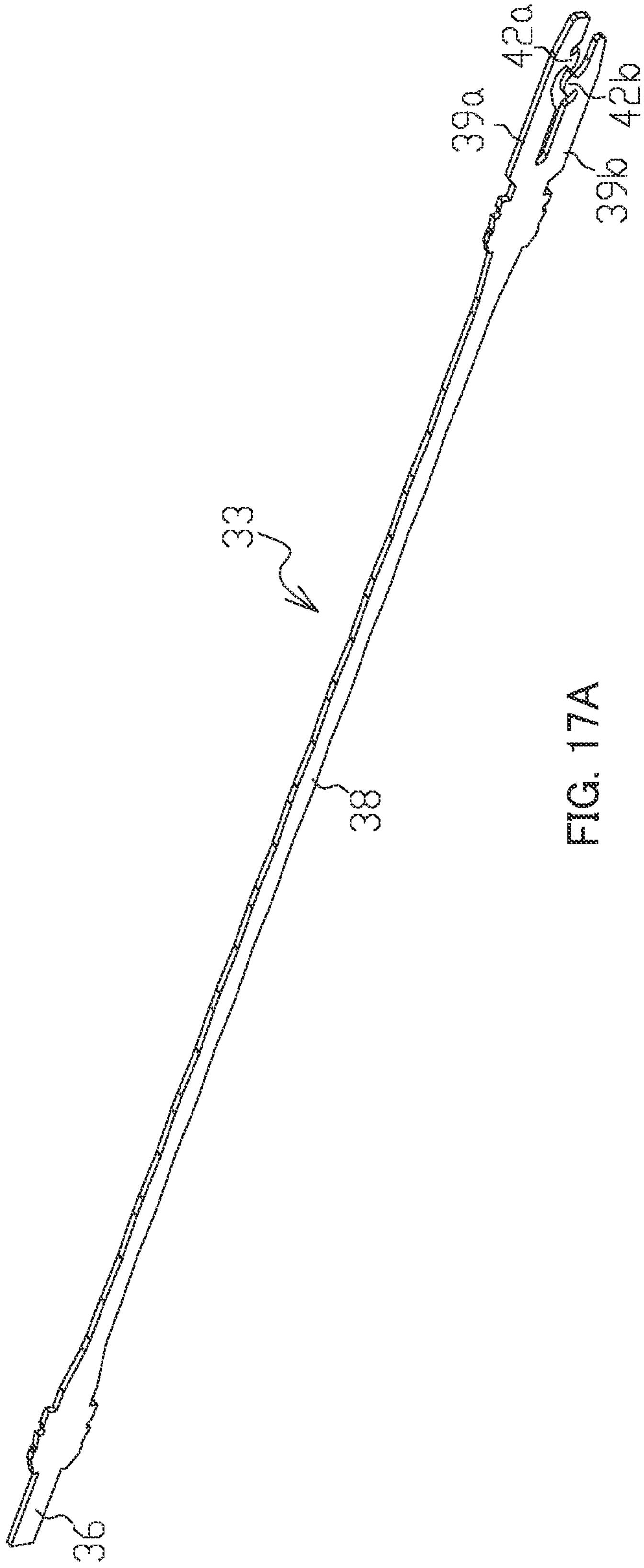
FIGS. 17A and 17B are developments of the contact as the element of the receptacle connector according to Embodiment 2.
Figure 17B:
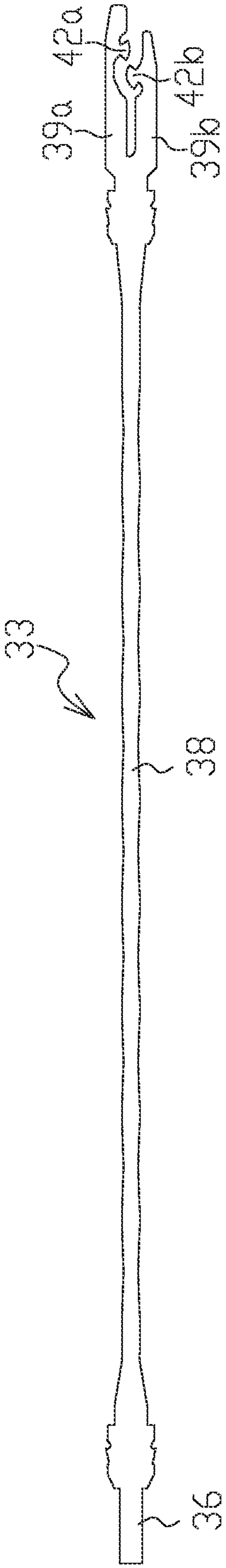

FIG. 14 is a perspective view illustrating a structure of each first contact 33. FIG. 15A is a plan view illustrating the structure of first contact 33. FIG. 15B is a front view illustrating the structure of first contact 33. FIG. 15C is a bottom view illustrating the structure of first contact 33. FIG. 15D is a left side view illustrating the structure of first contact 33. FIG. 15E is a right side view illustrating the structure of first contact 33. In addition, FIG. 16 is an enlarged view illustrating the structure of first contact 33. FIGS. 17A and 17B are developments of first contact 33 (before first contact 33 is bent), in which FIG. 17A is a perspective view and FIG. 17B is a front view. The shape of each second contact 34 is the same as that of first contact 33. First contact 33 and second contact 34 are shaped in line symmetry with respect to the center line of receptacle connector 29 extending in the Y direction.

Mounting portion 36 is formed at the end of first contact 33 that faces the −X side in the X direction. The surface of mounting portion 36 that faces relay circuit board 4 is joined to a first pad (not illustrated) of relay circuit board 4, for example, by soldering. First contact 33 is bent like the letter L at the end of mounting portion 36 that faces the +X side so as to extend toward the +Z side in the X direction. First contact 33 is subsequently folded at folded portion 37 so as to extend toward the −Z side. Board-to-board connector 27 is a floating-type connector. Accordingly, first contact 33 has wave-shaped flexible portion 38 between folded portion 37 and bifurcated portions (first elastic portion 39*a* and second elastic portion 39*b*), which will be described later. Flexible portion 38 has elasticity and follows the movement of plug connector 31*b* when plug connector 31*b* moves relative to receptacle connector 29. Even if, for example, at least one of relay circuit board 4 and the light-emitting element circuit board deviates positionally when plug connector 31*b* engages receptacle connector 29, flexible portion 38 follows, and thereby absorbs, positional deviation of relay circuit board 4 and the light-emitting element circuit board. Moreover, even if at least one of relay circuit board 4 and the light-emitting element circuit board deviates positionally after the engagement, flexible portion 38 follows, and thereby absorbs, the positional deviation of at least one of the relay circuit board 4 and the light-emitting element circuit board, which thereby maintains the connection between receptacle connector 29 and the plug connector (between first contact 33 and the corresponding contact of the plug connector).

First contact 33 has bifurcated portions that are branched at the end of flexible portion 38 that faces the +X side. More specifically, first contact 33 has first elastic portion (first contact arm) 39*a*, which is one of the bifurcated portions, and second elastic portion (second contact arm) 39*b*, which is the other one of the bifurcated portions. First elastic portion 39*a* extends toward the +X side from the end facing the −X side. First elastic portion 39*a* has bent portion 40*a* that is bent toward the −Z side so as to form a shape like the letter L. First contact 33 has length adjustment portion 41 shaped like the letter U at a position between bent portion 40*a* and the base from which bifurcated portions start. Length adjustment portion 41 will be described more in detail later. First contact 33 has first contact point 42*a* formed at a position between bent portion 40*a* and the tip end of first contact 33 near the +X side. First contact point 42*a* comes into contact with a contact of the plug connector (not illustrated). Second elastic portion 39*b* extends toward the +X side from the end facing the −X side. Second elastic portion 39*b* has bent portion 40*b* that is bent toward the −Z side so as to form a shape like the letter L. First contact 33 has second contact point 42*b* at a position between bent portion 40*b* and the tip end of first contact 33 near the +X side. Second contact point 42*b* comes into contact with the contact of the plug connector (not illustrated).

First contact point 42*a* and second contact point 42*b* oppose each other. Elastic forces of first elastic portion 39*a* and second elastic portion 39*b* cause first contact point 42*a* and second contact point 42*b* to nip the contact of the plug connector in the Y direction, thereby electrically connecting first contact 33 to the contact of the plug connector. Here, the base from which bifurcated portions start functions as the support portion (fixation portion) of first elastic portion 39*a* and second elastic portion 39*b*. A space is formed by bending first elastic portion 39*a* and second elastic portion 39*b* at respective bent portions 40*a* and 40*b* so as to form L-shaped portions, and this space functions as an elastic displacement space for first elastic portion 39*a* and second elastic portion 39*b*. Accordingly, elastic forces acting in the Y direction cause first contact point 42*a* and second contact point 42*b* to nip the contact of the plug connector and thereby electrically connect first contact 33 to the contact of the plug connector. In other words, the length of first contact 33 in the X direction can be reduced without sacrificing the function of first elastic portion 39*a* and second elastic portion 39*b* serving as elastic bodies and without sacrificing the spring lengths of first elastic portion 39*a* and second elastic portion 39*b*.

In addition, in the development of first contact 33 before bending, first elastic portion 39*a* and second elastic portion 39*b* have different forms, such as different shapes, thicknesses (plate thicknesses), or widths, and first contact point 42*a* and second contact point 42*b* do not overlap each other. Moreover, first contact point 42*a* and second contact point 42*b* do not oppose each other before bending (see FIG. 17). First contact point 42*a* and second contact point 42*b* are made to oppose each other after bending. More specifically, length adjustment portion 41 is bent into a shape like the letter U in the XZ plane. Length adjustment portion 41 thereby adjusts (absorbs) an extra length of first elastic portion 39*a* relative to the length of second elastic portion 39*b* and causes first contact point 42*a* and second contact point 42*b* to oppose each other in the direction of elasticity of first elastic portion 39*a* and second elastic portion 39*b* (i.e., in the Y direction). As a result of first contact point 42*a* and second contact point 42*b* opposing each other in the Y direction, generation of undesirable moments is prevented when the plug connector engages receptacle connector 29.

Length adjustment portion 41 may be bent into a shape different from the letter U insofar as the extra length of first elastic portion 39*a* can be adjusted relative to the length of second elastic portion 39*b*. In the present embodiment, length adjustment portion 41 is formed, for example, at a position between bent portion 40*a* and the base of the bifurcated portions. Length adjustment portion 41, however, may be formed at a position between bent portion 40*a* and first contact point 39*a*.

In addition, there is substantially no gap between first contact point 42*a* and second contact point 42*b* (in other words, the gap is smaller than the plate thickness of first contact 33). Accordingly, first contact point 42*a* and second contact point 42*b* can nip the contact of the plug connector firmly and thereby maintain a good electrical connection between receptacle connector 29 and the plug connector. Generally, a contact is formed by pressing (stamping). The contact needs to be stamped from a sheet material while the sheet material is kept flat. In general, a minimum width to be formed by stamping is equal to the thickness of the sheet material. Accordingly, if the length of first elastic portion 39*a* were the same as that of second elastic portion 39*b* in the longitudinal directions thereof (in the X direction), the width to be formed by stamping would be limited to the size of the gap between first elastic portion 39*a* and second elastic portion 39*b*. In this case, the plate thickness of the contact of the plug connector would need to be made thicker than the plate thickness of first contact 33. In other words, the plate thickness of the contact of the plug connector would be restricted. First elastic portion 39*a* and second elastic portion 39*b*, however, are made different in shape, and first contact point 42*a* and second contact point 42*b* are positioned differently from each other, which enables the gap between first contact point 42*a* and second contact point 42*b* to be narrower while conforming the requirements of pressing.

First contact point 42*a* has a sectoral protrusion protruding toward second contact point 42*b* (toward the −Y side). The protrusion is bent toward the −X side in such a manner that the protrusion forms a smoothly curved surface. Second contact point 42*b* also has a sectoral protrusion protruding toward first contact point 42*a* (toward the +Y side). The protrusion is bent toward the −X side in such a manner that the protrusion forms a smoothly curved surface (guiding portion). The curved surface of the protrusion can smoothly guide insertion of the contact when the contact of the plug connector is inserted between first contact point 42*a* and second contact point 42*b* obliquely, in other words, in an oblique direction in which the contact of the plug connector is inclined toward the +Z side from the longitudinal direction of first contact 33 (i.e., from the X direction). The entire surface of the protrusion is not necessarily curved, in other words, part of the surface of the protrusion may be curved, insofar as the contact of the plug connector can be inserted smoothly between first contact point 42*a* and second contact point 42*b*. The surface of the protrusion may be chamfered instead of being bent.

First contact point 42*a* and second contact point 42*b* do not oppose each other before bending, but after bending, first contact point 42*a* and second contact point 42*b* are made to oppose each other. This generates a difference in the amount of spring displacement (spring load) between first contact point 42*a* and second contact point 42*b*. To eliminate the difference, cavity 70 is formed in first elastic portion 39*a*. In other words, cavity 70 is formed in first elastic portion 39*a* that is longer than second elastic portion 39*b* in the longitudinal direction of first contact 33 (in the X direction), which can adjust the weight of first elastic portion 39*a* and thereby balance and equalize the nipping forces of first contact point 42*a* and second contact point 42*b*.

Note that the structure of the plug connector (not illustrated) to be connected to first contacts 33 is the same as that of plug connector 31*b* to be connected to second contacts 34. This plug connector and plug connector 31*b* are shaped in line symmetry with respect to the center line of receptacle connector 29 extending in the Y direction.

Board-to-board connector 27 of Embodiment 2 includes receptacle connector 29 equipped with first contacts 33 and second contacts 34 each having elasticity and each being shaped like the letter L. Accordingly, each one of first contacts 33 and second contacts 34 can be made shorter to the extent of the length of the bent portion, which otherwise extends linearly in the X direction, compared with an unbent contact that extends linearly in the engagement direction, such as a tuning fork type contact or a box-shaped contact. In other words, the size of receptacle connector 29 in the engagement direction can be reduced at least to the extent of the length of the bent portion of each of first contacts 33 and second contacts 34, which can thereby reduce the widthwise size of relay circuit board 4 on which receptacle connector 29 is mounted.

Figure 18:
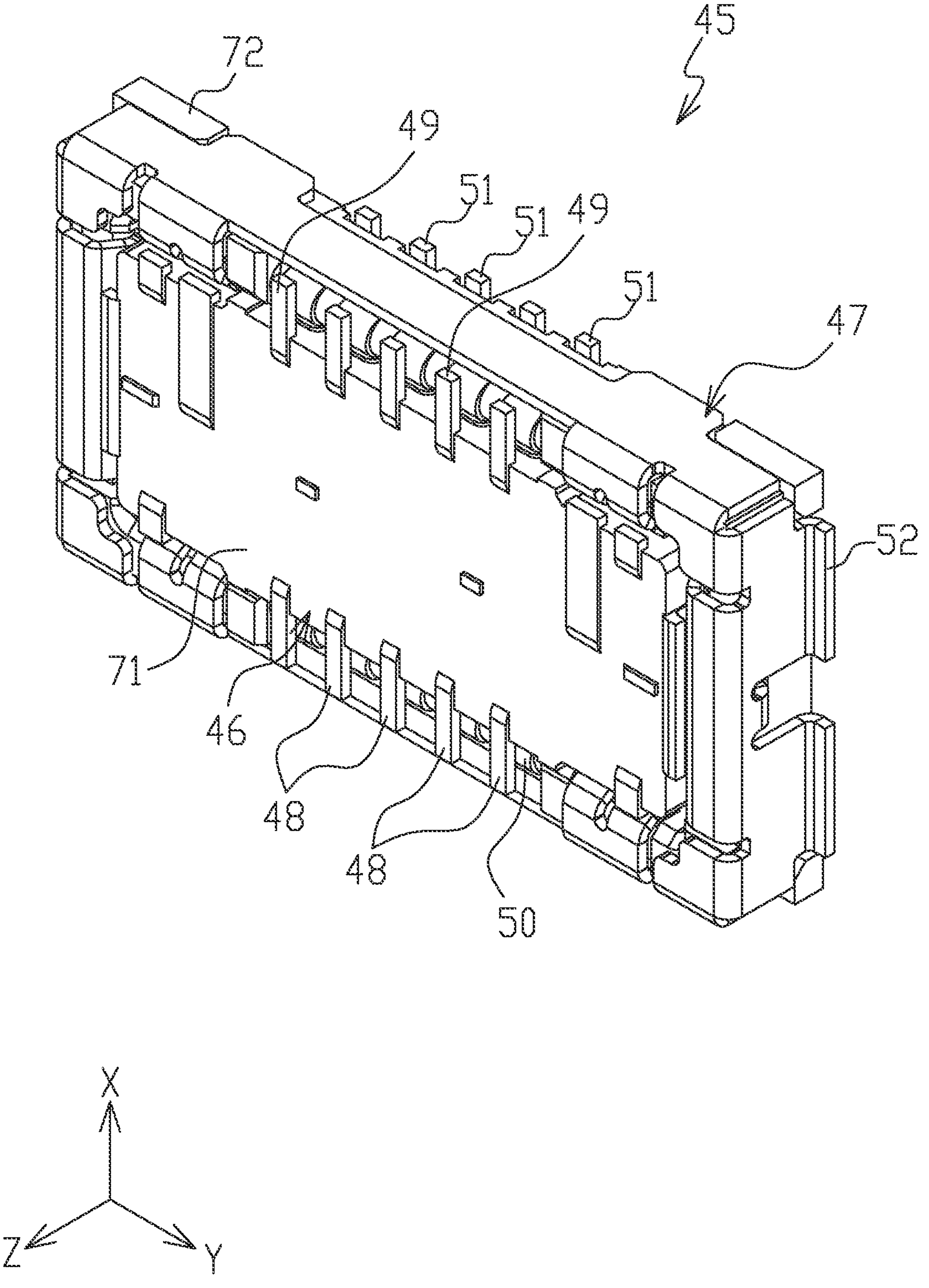
FIG. 18 is a perspective view illustrating a structure of a board-to-board connector according to Embodiment 3.
Figure 19:
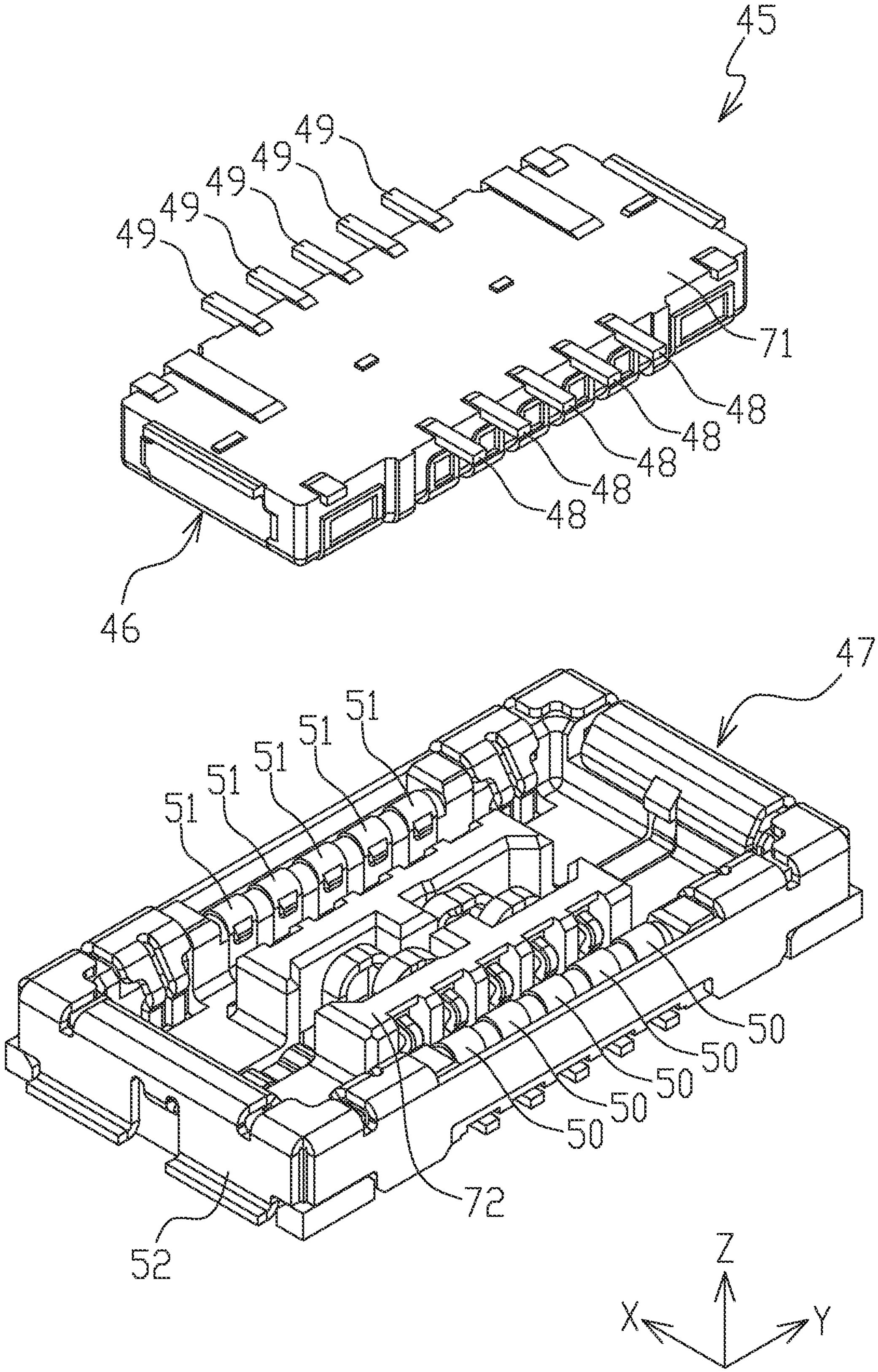
FIG. 19 is a perspective view illustrating the structure of the board-to-board connector according to Embodiment 3.
Figure 20:
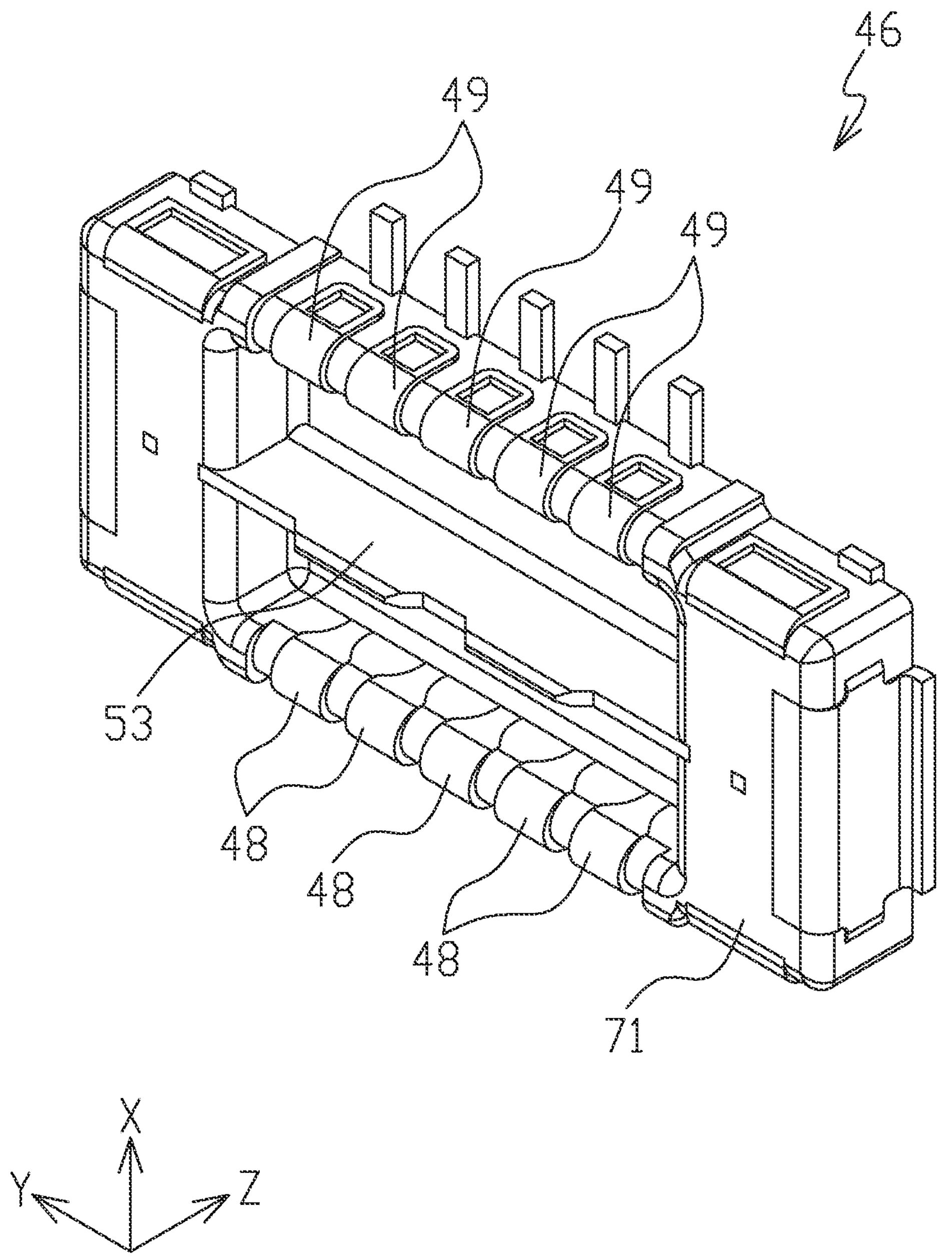
FIG. 20 is a perspective view illustrating a structure of a plug connector according to Embodiment 3.

Next, a board-to-board connector according to Embodiment 3 of the present invention will be described with reference to the drawings. FIG. 18 is a perspective view illustrating a structure of the board-to-board connector according to Embodiment 3. In the following descriptions, as is the case for Embodiment 1, the XYZ orthogonal coordinate system is defined as illustrated in FIG. 18, and positional relationships of members, for example, will be described with reference to the orthogonal coordinate system. As illustrated in FIG. 18, board-to-board connector 45 includes plug connector 46 and receptacle connector 47. FIG. 19 is a perspective view illustrating a structure of board-to-board connector 45 of Embodiment 3 in a state before plug connector 46 engages receptacle connector 47. FIG. 20 is a perspective view illustrating a structure of the plug connector 46. Plug connector 46 and receptacle connector 47 are mounted on a circuit board (not illustrated).

Plug connector 46 and receptacle connector 47 engage each other in the Z direction. Plug connector 46 includes five first contacts 48, five second contacts 49, and ground plate 53 positioned between first contacts 48 and second contacts 49. First contacts 48, second contacts 49, and ground plate 53 are embedded in insulator 71. Five first contacts 48 oppose five second contacts 49 in the X direction. Five first contacts 48 as well as five second contacts 49 are arranged equidistantly in the Y direction.

Receptacle connector 47 includes five first contacts 50, five second contacts 51, and shell 52. Five first contacts 50 and five second contacts 51 are embedded in insulator 72. Five first contacts 50 oppose five second contacts 51 in the X direction. Five first contacts 50 as well as five second contacts 51 are arranged equidistantly in the Y direction. First contacts 48 of plug connector 46 are electrically connected to respective ones of first contacts 50 of receptacle connector 47. Similarly, second contacts 49 of plug connector 46 are electrically connected to respective ones of second contacts 51 of receptacle connector 47.

Figure 21:
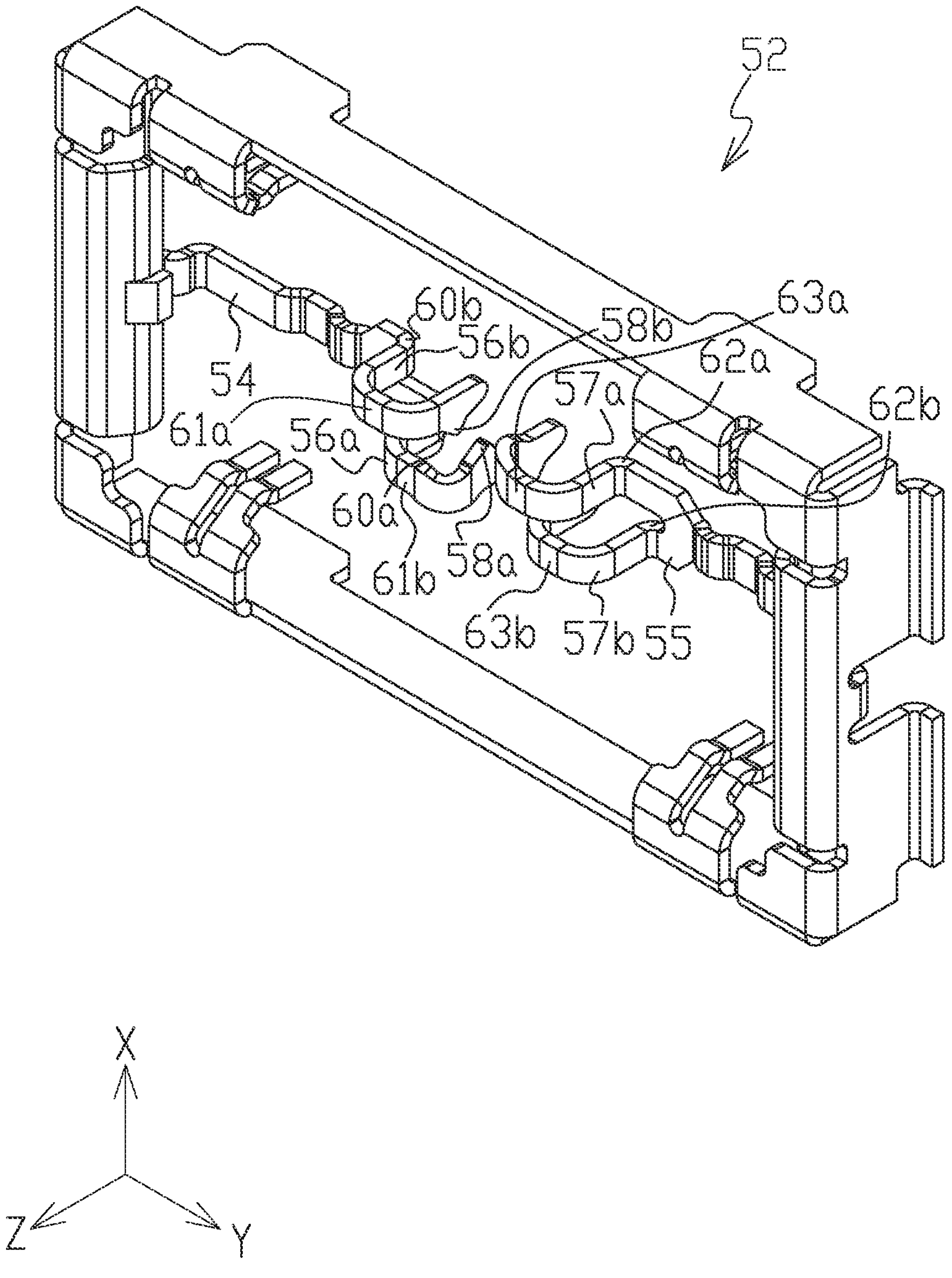
FIG. 21 is a perspective view illustrating a structure of a shell as an element of a receptacle connector according to Embodiment 3.
Figure 22A:
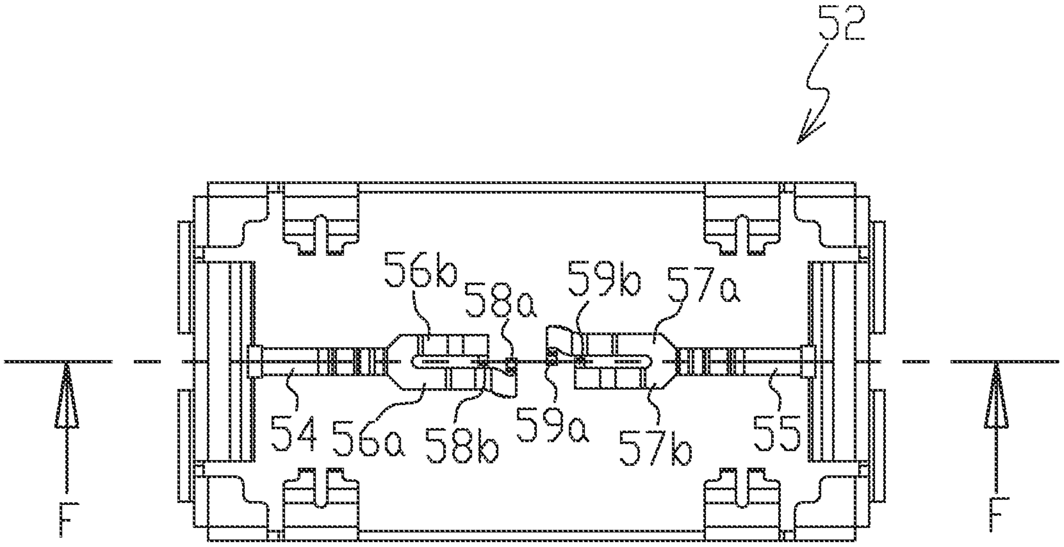
FIGS. 22A and 22B are views illustrating the structure of the shell as the element of the receptacle connector according to Embodiment 3.
Figure 22B:
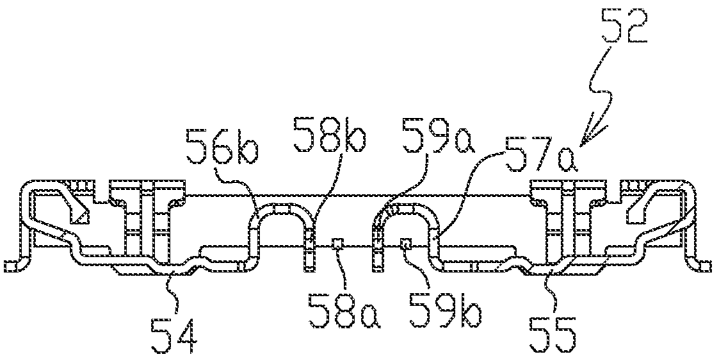
Figure 23:
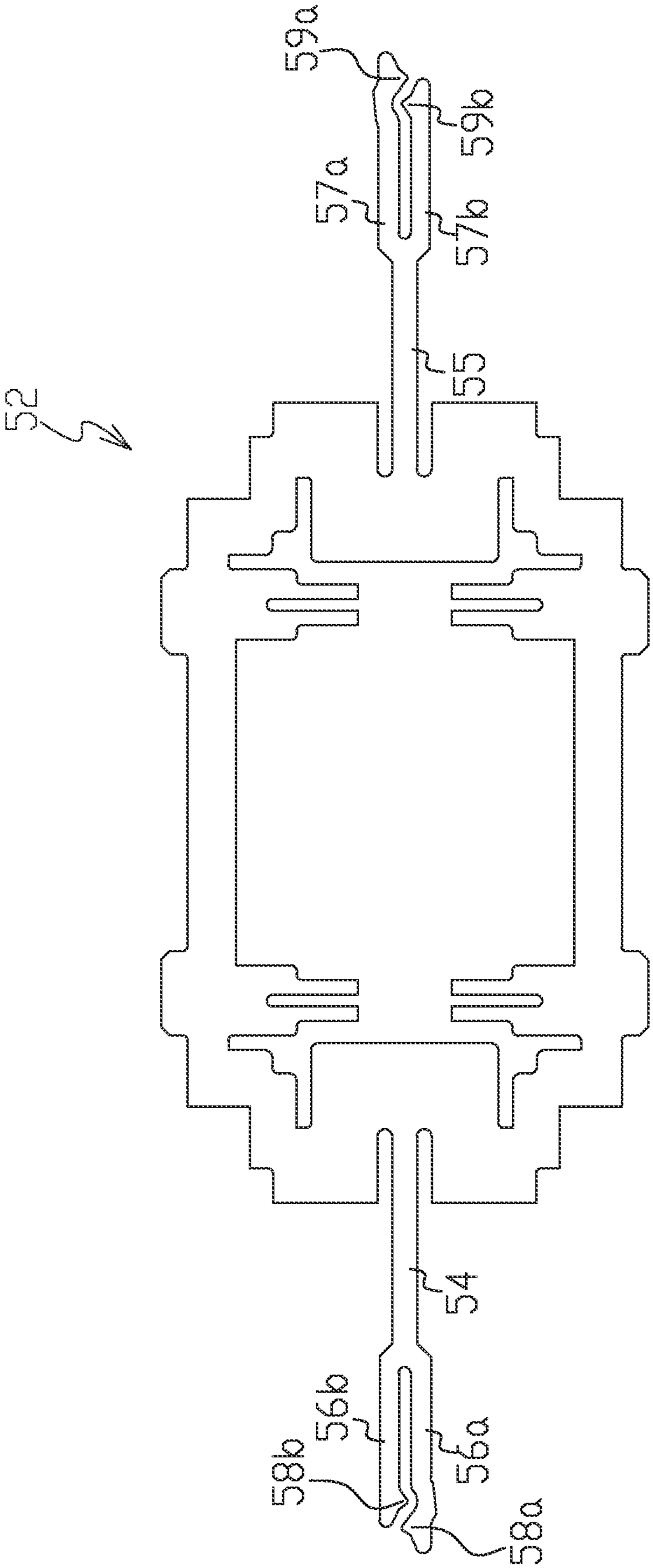
FIG. 23 is a development of the shell as the element of the receptacle connector according to Embodiment 3.

FIG. 21 is a perspective view illustrating a structure of shell 52 of receptacle connector 47. FIG. 22A is a plan view illustrating the structure of shell 52. FIG. 22B is a front view illustrating the structure of shell 52. FIG. 23 is a development of shell 52 (in a state before bending). Shell 52 includes first ground contact 54 that extends toward the +Y side in the Y direction from the center of a side portion that faces the −Y side. Shell 52 also includes second ground contact 55 that extends toward the −Y side from the center of a side portion that faces the +Y side.

First ground contact 54 has first elastic portion (first contact arm) 56*a*, which is one of bifurcated portions, and second elastic portion (second contact arm) 56*b*, which is the other one of the bifurcated portions. First elastic portion 56*a* has first contact point 58*a* formed at the tip end thereof. First contact point 58*a* comes into contact with ground plate 53 of plug connector 46 and is thereby grounded. First elastic portion 56*a* has a bent portion at a position between first contact point 58*a* and the base from which the bifurcated portions start. The bent portion has L-shaped portion 60*a* that is bent at the base of the bifurcated portions toward the +Z side and also has U-shaped portion 61*a* that is bent therefrom toward the +Y side and further bent toward the −Z side.

Second elastic portion 56*b* has second contact point 58*b* formed at the tip end thereof. Second contact point 58*b* comes into contact with ground plate 53 of plug connector 46 and is thereby grounded. Second elastic portion 56*b* has a bent portion at a position between second contact point 58*b* and the base from which the bifurcated portions start. The bent portion has L-shaped portion 60*b* that is bent from the base of the bifurcated portions toward the +Z side and also has U-shaped portion 61*b* that is bent therefrom toward the +Y side and further bent toward the −Z side.

First contact point 58*a* faces the +X side, and second contact point 58*b* faces the −X side. Ground plate 53 of plug connector 46 is nipped in the X direction by elastic forces of first elastic portion 56*a* and second elastic portion 56*b*, which electrically connects shell 52 to ground plate 53 of plug connector 46. Here, the base from which bifurcated portions start functions as the support portion (fixation portion) of first elastic portion 56*a* and second elastic portion 56*b*. A space is formed between the bent portion of first elastic portion 56*a* and the bent portion of second elastic portion 56*b*, and this space functions as an elastic displacement space for first elastic portion 56*a* and second elastic portion 56*b*. Accordingly, elastic forces acting in the X direction cause first contact point 58*a* and second contact point 58*b* to nip ground plate 53 and thereby electrically connect shell 52 to ground plate 53. In other words, the length of first ground contact 54 in the Y direction can be reduced without sacrificing the function of first elastic portion 56*a* and second elastic portion 56*b* serving as elastic bodies and without sacrificing the spring lengths of first elastic portion 56*a* and second elastic portion 56*b*.

Second ground contact 55 has first elastic portion 57*a*, which is one of bifurcated portions, and second elastic portion 57*b*, which is the other one of the bifurcated portions. First elastic portion 57*a* has first contact point 59*a* formed at the tip end thereof. First contact point 59*a* comes into contact with ground plate 53 of plug connector 46 and is thereby grounded. First elastic portion 57*a* has a bent portion at a position between first contact point 59*a* and the base from which the bifurcated portions start. The bent portion has L-shaped portion 62*a* that is bent from the base of the bifurcated portions toward the +Z side and also has U-shaped portion 63*a* that is bent therefrom toward the −Y side and further bent toward the −Z side.

Second elastic portion 57*b* has second contact point 59*b* formed at the tip end thereof. Second contact point 59*b* comes into contact with ground plate 53 of plug connector 46 and is thereby grounded. Second elastic portion 57*b* has a bent portion at a position between second contact point 59*b* and the base from which the bifurcated portions start. The bent portion has L-shaped portion 62*b* that is bent from the base of the bifurcated portions toward the +Z side and also has U-shaped portion 63*b* that is bent therefrom toward the −Y side and further bent toward the −Z side.

First contact point 59*a* faces the −X side, and second contact point 59*b* faces the +X side. Ground plate 53 of plug connector 46 is nipped in the X direction by elastic forces of first elastic portion 57*a* and second elastic portion 57*b*, which electrically connects shell 52 to ground plate 53 of plug connector 46. Here, the base from which bifurcated portions start functions as the support portion (fixation portion) of first elastic portion 57*a* and second elastic portion 57*b*. A space is formed between the U-shaped portion of first elastic portion 57*a* and the U-shaped portion of second elastic portion 57*b*, and this space functions as an elastic displacement space for first elastic portion 57*a* and second elastic portion 57*b*. Accordingly, elastic forces acting in the X direction cause first contact point 59*a* and second contact point 59*b* to nip ground plate 53 and thereby electrically connect shell 52 to ground plate 53. In other words, the length of second ground contact 55 in the Y direction can be reduced without sacrificing the function of first elastic portion 57*a* and second elastic portion 57*b* serving as elastic bodies and without sacrificing the spring lengths of first elastic portion 57*a* and second elastic portion 57*b*. Extra lengths of first elastic portions 56*a* and 57*a* relative to the lengths of second elastic portions 56*b* and 57*b* are adjusted by U-shaped portions 61*a* and 63*a*.

In the Y direction, the lengths of first elastic portions 56*a* and 57*a* are greater than respective lengths of second elastic portions 56*b* and 57*b*. In addition, compared with second elastic portions 56*b* and 57*b*, first elastic portions 56*a* and 57*a* have different forms, such as different shapes, thicknesses (plate thicknesses), or widths. Accordingly, in the development state of shell 52, first contact portions 58*a* and 59*a* do not overlap corresponding second contact portions 58*b* and 59*b* (see FIG. 23). If first elastic portions 56*a* and 57*a* had the same forms as those of second elastic portions 56*b* and 57*b*, the gaps between first contact points 58*a* and 59*a* and corresponding second contact points 58*b* and 59*b* in the X direction would need to be equal to or greater than the plate thickness, which restricts the plate thickness of ground plate 53. The forms of first elastic portions 56*a* and 57*a*, however, are made different from those of second elastic portions 56*b* and 57*b* as illustrated in FIG. 23, and first contact points 58*a* and 59*a* and corresponding second contact points 58*b* and 59*b* are positioned differently, which enables the gaps between first contact points 58*a* and 59*a* and corresponding second contact points 58*b* and 59*b* to be smaller in the nipping direction (in the X direction) while conforming the requirements of pressing.

Board-to-board connector 45 of Embodiment 3 includes receptacle connector 47 equipped with shell 52, and shell 52 includes first ground contact 54 and second ground contact 55 that have elastic bodies bent like the letter L and also like the letter U. First ground contact 54 and second ground contact 55 are bent and folded, and to the extent of bending and folding, the lengths of first ground contact 54 and second ground contact 55 can be reduced.

Embodiments have been described, by way of example, using board-to-board connectors 1 and 27 to be used in the backlight module (lighting module) for a liquid crystal screen. The connector of the present invention, however, may be applied to electronic devices other than the liquid crystal backlight module (lighting module). Embodiments have been described, by way of example, using board-to-board connector 1 in which plug connectors 3*a* and 3*b* engage receptacle connector 2, or board-to-board connector 27 in which plug connector 31*b* engages receptacle connector 29, or board-to-board connector 45 in which plug connector 46 engages receptacle connector 47. The contact of the present invention may be applied to other connectors than the above board-to-board connectors, such as board-to-electric wire connectors or board-to-FPC (FFC) connectors. In other words, first contacts 10*a* to 10*f* (second contacts 11*a* to 11*f*) of receptacle connector 2 may be configured to be connected to a connector (a connector for electric wires or a connector for FPC or FFC) other than plug connectors 3*a* and 3*b*.

In the above embodiments, the example in which one receptacle connector 2 is connected to two plug connectors 3*a* and 3*b* has been described. The one receptacle connector may be configured to be connected to one plug connector. In the above embodiments, the bent portion has been described, by way of example, as having a shape like the letter L or U or a combination thereof, but the bent portion may have a hat-like shape.

In the above embodiments, the contact and the ground contact have been described, by way of example, as having two elastic portions (the first elastic portion and the second elastic portion), but the contact and the ground contact may each have at least one elastic portion. In addition, the contact (ground contact) has been described, by way of example, as having two contact points (the first contact point and the second contact point), but the contact may have at least one contact point. For example, the contact (ground contact) may have two elastic portions, and the contact point may be formed on either one of the elastic portions. Alternatively, the contact (ground contact) may be configured such that one of the bifurcated portions has elasticity and both bifurcated portions have respective contact points. Alternatively, the contact (ground contact) may be configured such that one of the bifurcated portions has elasticity and one of the bifurcated portions has a contact point.

REFERENCE SIGNS LIST

1, 27, 45 Board-to-board connector
2, 29, 47 Receptacle connector
3*a*, 3*b*, 31*b*, 46 Plug connector
4 Relay circuit board
5*a*, 5*b* Light-emitting element circuit board
6, 32, 71, 72 Insulator
8*a*, 8*b* Fitting nail
10*a* to 10*f*, 33, 48, 50 First contact
11*a* to 11*f*, 34, 49, 51 Second contact
12*a* to 12*f* First receiving cavity
14*a* to 14*f* First pad
15*a* to 15*f* Second pad
16 Central portion
17, 36 Mounting portion
18 Elastic portion
18*a*, 39*a*, 56*a*, 57*a* First elastic portion
18*b*, 39*b*, 56*b*, 57*b* Second elastic portion
19*a*, 42*a*, 58*a*, 59*a* First contact point
19*b*, 42*b*, 58*b*, 59*b* Second contact point
20*a* to 20*f*, 21*a* to 21*f*, 43 Contact
22*a* to 22*f* Pad
24 Insulator
26*a*, 26*b* Fitting nail
35, 52 Shell
37 Folded portion
38 Flexible portion
40*a*, 40*b* Bent portion
41 Length adjustment portion
53 Ground plate
54 First ground contact
55 Second ground contact
60*a*, 60*b*, 62*a*, 62*b* L-shaped portion
61*a*, 61*b*, 63*a*, 63*b* U-shaped portion
70 Cavity

What is claimed is:

1. A connector configured to be engaged with a counterpart connector, the connector comprising:
an insulator;
a first contact incorporated into the insulator;
a second contact incorporated into the insulator;
a shell fixed to at least part of a periphery portion of the insulator in plan view viewed from an engagement direction of the connector, and grounded; and
a ground contact portion including a contact arm that comes into elastic contact with and is electrically connected to a counterpart ground contact portion of the counterpart connector, wherein
the ground contact portion includes an extension part which extends from the shell toward a region between the first contact and the second contact,
the extension part includes a free end on a distal end side in a longitudinal direction along a direction in which the first contact and the second contact are disposed, and includes a fixed end connected to the shell on a base end side of the longitudinal direction, and
the contact arm is provided at the free end of the extension part, and includes a first contact arm and a second contact arm that are branched at a bifurcation that is an end of the extension part,
the first contact arm and the second contact arm nipping the counterpart ground contact portion by elastic force.

2. The connector according to claim 1, wherein
the extension part includes a plate-shaped part whose plate thickness direction coincides with the engagement direction.

3. The connector according to claim 2, wherein
the plate-shaped part is disposed on a bottom surface of the connector, the bottom surface being orthogonal to the engagement direction.

4. The connector according to claim 2, wherein
the ground contact portion includes, as the extension part, a relay portion that couples the shell with the contact arm.

5. The connector according to claim 4, wherein
the plate-shaped part is part of the relay portion.

6. The connector according to claim 1, wherein
the shell and the ground contact portion are configured from one member.

7. The connector according to claim 1, wherein
the first contact arm and the second contact arm each include a contact point with the counterpart ground contact portion on a fractured surface formed by stamping.

8. The connector according to claim 7, wherein
at least one of the first contact arm and/or the second contact arm includes a bent portion bent in the plate thickness direction.

9. The connector according to claim 8, wherein:
the first contact arm includes a first contact point that comes into contact with the counterpart ground contact portion;
the second contact arm includes a second contact point that comes into contact with the counterpart ground contact portion; and
in a developed state before bending, a length from the bifurcation to the first contact point in the first contact arm differs from a length from the bifurcation to the second contact point in the second contact arm.

10. The connector according to claim 9, wherein
in an assembled state after the bending, the first contact point and the second contact point are disposed to face each other in a direction substantially orthogonal to the longitudinal direction and the engagement direction.

11. The connector according to claim 10, wherein
in the assembled state after the bending, the first contact point and the second contact point are disposed to be displaced in the longitudinal direction.

12. The connector according to claim 9, wherein:
in the developed state, a width to be formed by stamping when the first contact arm and the second contact arm are formed by the stamping is larger than a plate thickness of the ground contact portion; and
in the assembled state after the bending, a distance between the first contact point and the second contact point in the direction substantially orthogonal to the longitudinal direction and the engagement direction is smaller than the width to be formed by the stamping.

13. The connector according to claim 8, wherein the bent portion has a shape like a letter L, like a letter U, like a combination of the letter L and the letter U, or like a hat.

14. The connector according to claim 1, wherein:

the shell has a substantially rectangular shape with a pair of short sides and a pair of long sides; and the ground contact portion is connected to one of the short sides.

15. The connector according to claim 1, wherein the connector includes two of the ground contact portions respectively including distal end portions disposed so as to face each other.

16. The connector according to claim 1, wherein:

the connector includes two of the ground contact portions respectively including distal end portions disposed so as to face each other;

the first contact arm includes a first contact point that comes into contact with the counterpart ground contact portion;

the second contact arm includes a second contact point that comes into contact with the counterpart ground contact portion; and a pair of the first contact point and the second contact point in one of the two ground contact portions and a pair of the first contact point and the second contact point in the other one of the two ground contact portions are disposed so as to be symmetrical about a point between the two ground contact portions.

17. A connector set, comprising:

a receptacle connector including the connector according to claim 1; and a plug connector configured to engage with the receptacle connector, wherein the plug connector includes a ground plate portion to be inserted into the region between the first contact and the second contact, the ground plate portion coming into contact with the ground contact portion.

* * * * *